US007981296B2

(12) United States Patent
Cronia et al.

(10) Patent No.: US 7,981,296 B2
(45) Date of Patent: Jul. 19, 2011

(54) METHODS OF USING GEOTEXTILE COMPOSITE FOR FILTRATION OF CONTAMINATED LIQUIDS AND SEDIMENTS

(75) Inventors: Forrest E. Cronia, Florence, SC (US); Cameron B. Gallamore, Charlotte, NC (US); Steven E. Lothspeich, Charlotte, NC (US)

(73) Assignee: Huesker, Inc., Charlotte, NC (US)

( * ) Notice: Subject to any disclaimer, the term of this patent is extended or adjusted under 35 U.S.C. 154(b) by 0 days.

(21) Appl. No.: 13/007,896

(22) Filed: Jan. 17, 2011

(65) Prior Publication Data
US 2011/0108487 A1    May 12, 2011

Related U.S. Application Data

(62) Division of application No. 11/935,128, filed on Nov. 5, 2007, now Pat. No. 7,870,965.

(51) Int. Cl.
*B01D 15/00* (2006.01)
(52) U.S. Cl. ........................................... 210/660
(58) Field of Classification Search .................. 210/660
See application file for complete search history.

(56) References Cited

U.S. PATENT DOCUMENTS

| | | | | |
|---|---|---|---|---|
| 4,344,722 A * | 8/1982 | Blais | ............................. | 405/270 |
| 4,565,468 A * | 1/1986 | Crawford | ....................... | 405/270 |
| 4,565,727 A * | 1/1986 | Giglia et al. | .................. | 428/172 |
| 4,787,949 A * | 11/1988 | Cole et al. | ...................... | 156/222 |
| 5,141,794 A * | 8/1992 | Arroyo | ........................... | 428/138 |
| 5,237,945 A * | 8/1993 | White | ............................ | 112/420 |
| 5,302,295 A * | 4/1994 | Kellogg et al. | ................ | 210/710 |
| 5,434,332 A * | 7/1995 | Cash | .................................. | 588/1 |
| 5,486,410 A * | 1/1996 | Groeger et al. | ................ | 442/353 |
| 5,501,753 A * | 3/1996 | Stark | ................................ | 156/70 |
| 5,582,865 A * | 12/1996 | Rezuke et al. | ................. | 427/244 |
| 5,620,545 A * | 4/1997 | Braun et al. | ................... | 156/205 |
| 5,674,339 A | 10/1997 | Groeger et al. | | |
| 5,707,735 A * | 1/1998 | Midkiff et al. | ................ | 428/373 |
| 5,759,394 A * | 6/1998 | Rohrbach et al. | ............. | 210/264 |
| 5,877,096 A * | 3/1999 | Stevenson et al. | .............. | 442/36 |
| 5,980,996 A * | 11/1999 | Terry et al. | ..................... | 427/513 |
| 6,200,368 B1 * | 3/2001 | Guerin et al. | ................... | 96/135 |
| 6,290,637 B1 * | 9/2001 | Eighmy | ......................... | 588/256 |
| 6,395,190 B1 * | 5/2002 | Koslow et al. | ................ | 210/767 |
| 6,517,709 B1 * | 2/2003 | Cardwell et al. | .............. | 210/164 |
| 6,558,081 B2 * | 5/2003 | Hull | ............................. | 405/157 |

(Continued)

OTHER PUBLICATIONS

Supplemental European Search Report for PCT/US 2008012344 dated Jan. 19, 2011.

*Primary Examiner* — Chester T Barry
(74) *Attorney, Agent, or Firm* — Jenkins, Wilson, Taylor & Hunt, P.A.

(57) ABSTRACT

Geotextile composite configured to filter liquids and related methods are provided. The geotextile composites include a pre-filter layer, a post-filter layer and at least two intermediate filter layers disposed between the pre-filter layer and the post-filter layer. At least one fibrous web that includes composite fibers and adsorptive particulates is disposed between the at least two intermediate filters. The fibrous web has a structural component, and a thermally-bondable, polymeric component. The geotextile can be placed in a location where a liquid that contains contaminants therein resides. The liquids can pass through the geotextile such that the liquid contacts the adsorptive particulate. The contaminants are then filtered from the liquid through contact of the contaminants with the adsorptive particulate.

6 Claims, 13 Drawing Sheets

U.S. PATENT DOCUMENTS

| | | | | |
|---|---|---|---|---|
| 6,729,807 | B1* | 5/2004 | Spittle | 405/302.7 |
| 6,783,802 | B2* | 8/2004 | Darlington et al. | 427/333 |
| 6,852,813 | B2* | 2/2005 | Darlington et al. | 526/223 |
| 7,012,042 | B1* | 3/2006 | Cataldo et al. | 504/347 |
| 7,074,174 | B2* | 7/2006 | Lindgren et al. | 588/249.5 |
| 7,128,498 | B2* | 10/2006 | Sheahan et al. | 405/128.75 |
| 2005/0103707 | A1* | 5/2005 | Olsta et al. | 210/502.1 |
| 2006/0000767 | A1* | 1/2006 | Trauger et al. | 210/503 |
| 2006/0230731 | A1* | 10/2006 | Kalayci et al. | 55/486 |
| 2006/0237369 | A1* | 10/2006 | Kirts et al. | 210/681 |
| 2006/0286888 | A1* | 12/2006 | Olsta et al. | 442/417 |
| 2007/0059542 | A1* | 3/2007 | Olsta et al. | 428/480 |

* cited by examiner

METHODS OF USING GEOTEXTILE COMPOSITE FOR FILTRATION OF CONTAMINATED LIQUIDS AND SEDIMENTS

RELATED APPLICATIONS

This application is a divisional of and claims priority benefits to U.S. patent application Ser. No. 11/935,128, filed Nov. 5, 2007, now U.S. Pat. No. 7,870,965, the entire contents of which are hereby incorporated by reference herein.

TECHNICAL FIELD

The present subject matter described herein relates generally to geotextile composites used to contain and filter contaminated liquids. More particularly, the subject matter described herein relates to a geotextile composite comprising nonwoven layers which may contain different density and size of fibers as well as different porosities with adsorptive particles distributed uniformly across an entire sheet of the geotextile composite with the adsorptive particles immobilized in at least one layer thereby permitting the geotextile composite to be oriented in either a vertical or horizontal direction without any further support and to perform filtration on liquids flowing through the geotextile composite.

BACKGROUND

Containment and purification of contaminated liquids has become a major environmental concern. For example, water passing through landfills often picks up contaminants before passing back into the surrounding earth. Such contaminated liquid enters the water table and can contaminate wells, streams, and rivers. Further, industrial pollution and more severely, industrial accidents, often pollute streams, rivers and other bodies of water. When such releases occur in flowing water, such as rivers, the contaminants often settle on the bottom of the waterbed, thereby continuing to contaminate water that passes into the ground from the body of water. More immediately, large environmental spills can greatly affect the ecology of a body of water and its surrounding environment.

To combat these issues, geotextiles have been developed which can help to filter out such contaminants and contain them. Often, these geotextiles are no more than nonwoven fabrics which can be laid within the bottom of a landfill before it is used or can be laid on the bed of a body of water. Others have tried to incorporate materials which can help remove the contaminants or absorb the contaminants for removal. For example, carbon-powder slurry-coated nonwovens have been used. These slurry-coated nonwovens are inexpensive and have low pressure drops. However, these nonwovens have relatively poor adsorption performance due to the small amount of carbon present, much of which is covered by adhesives.

Another example includes a high loft conglomeration of fibers which create spaces therebetween provided by AMCOL. During or after the laying of the fibers, adsorptive material can be added. These adsorptive materials are small enough to fit into the spaces between the fibers thereby helping to create a nonwoven sheet with adsorptive properties. However, while these adsorptive particles fill in the spaces between the fibers, they are not held in place. Therefore, the adsorptive particulates have a tendency to fall out or migrate during handling and use thereby being removed from the geotextile. Once the adsorptive particles start to dissipate from the nonwoven, an uneven distribution of adsorptive properties occurs within the geotextile. Therefore, as ground water or other liquids flow through the geotextile, it is very likely that removal of contaminants would not be optimized since the ground water or liquid would flow through different crevices or areas of the geotextile which have either a lessened amount or no adsorptive particles to aid in the removal of the contaminants.

SUMMARY

In accordance with this disclosure, geotextile composites configured to filter liquids and methods of using the same are provided. According to one aspect, the geotextile composite can include a pre-filter layer, a post-filter layer and at least two intermediate filter layers disposed between the pre-filter layer and the post-filter layer. At least one fibrous web comprising composite fibers and adsorptive particulates is disposed between the at least two intermediate filters.

According to another aspect, the subject matter described herein includes a method for filtering a liquid and sediments to remove at least one contaminant therefrom which includes providing a geotextile composite. The geotextile composite can include a pre-filter layer, a post-filter layer, at least two intermediate filter layers disposed between the pre-filter layer and the post-filter layer, and at least one fibrous web comprising composite fibers and adsorptive particulates disposed between the at least two intermediate filters. The method also includes placing the geotextile in a location where a liquid that contains contaminants therein resides. The method also includes passing the liquids through the geotextile such that the liquid contacts the adsorptive particulate. Further, the method includes filtering the contaminants from the liquid through contact of the contaminants with the adsorptive particulate.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

DETAILED DESCRIPTION

Reference will now be made in detail to the description of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the present subject matter cover such modifications and variations.

Figure 1:
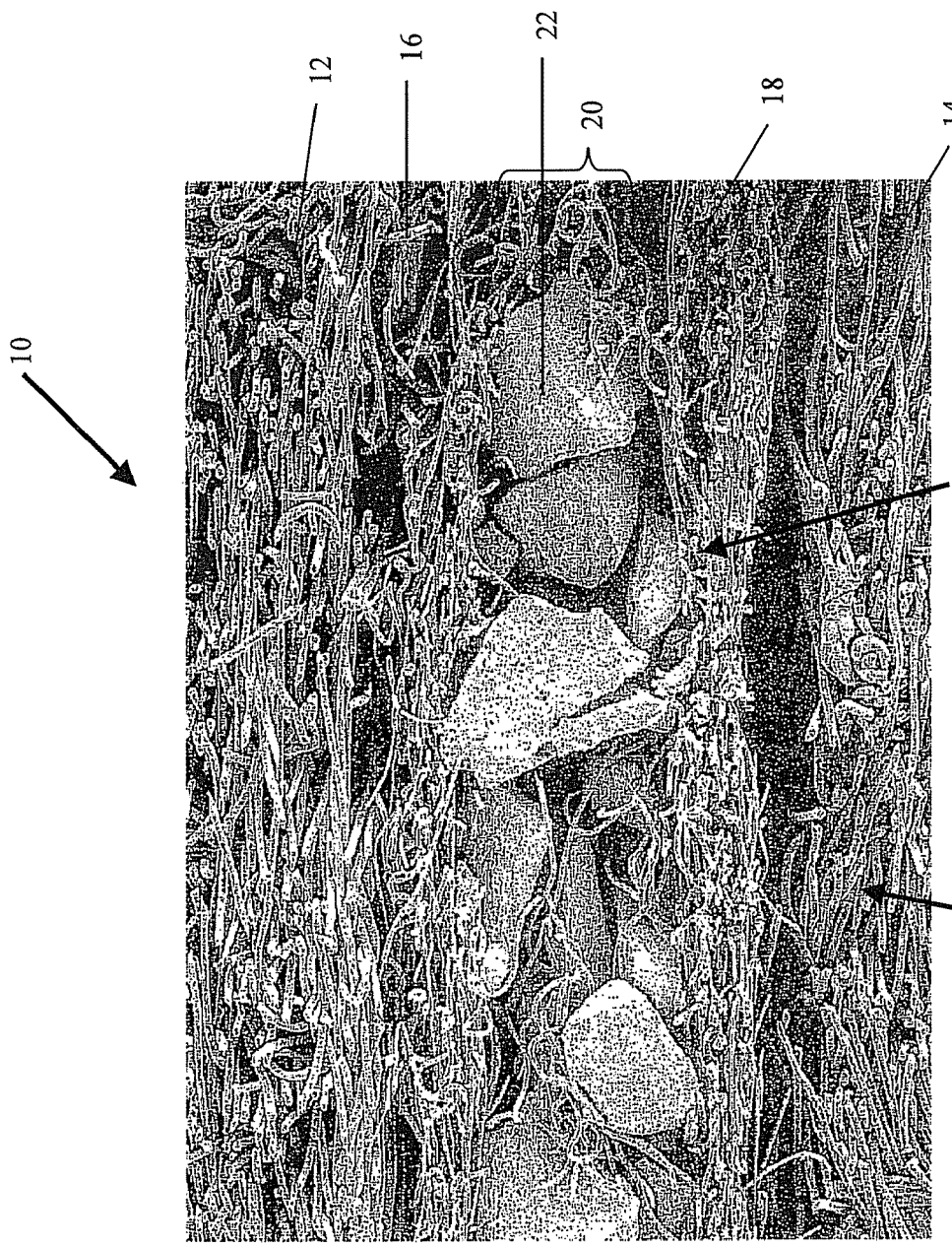
FIG. 1 illustrates an enlarged cross-sectional view through an embodiment of a geotextile composite according to the present subject matter.

FIG. 1 illustrates a geotextile composite generally designated 10 that can be used to filter liquids therethrough. Geotextile composite 10 provides an adsorptive layer to entrap contaminants within the liquid and creates torturous paths along which the liquid travels to increase contact of the liquid with the adsorptive layer. Geotextile composite 10 includes a pre-filter layer 12 which faces the liquid to be filtered. Geotextile composite 10 further includes a post-filter layer 14 which resides on the opposite side of geotextile composite 10 from pre-filter layer 12. Both pre-filter layer 12 and post-filter layer 14 can be nonwoven fabrics formed in a conventional way through processing of fibers. For example, pre-filter layer 12 and post-filter layer 14 can be a needle-punched nonwoven.

Pre-filter layer 12 can be generally the first layer of the geotextile composite 10 through which the liquid flows. Post-filter layer 14 can be generally the last layer of the geotextile composite 10 through which the liquid passes before exiting the geotextile composite 10. In some embodiments, pre-filter layer 12 can always serve as the pre-filter layer, i.e., the first layer of geotextile composite 10 to contact with the liquid containing the contaminants and post-filter layer 14 can serve as the post-filter, i.e., the last layer within the geotextile composite 10 through which the filtrate liquid passes before re-entering the surrounding environment. In other embodiments of geotextile composite 10, pre-filter layer 12 and post-filter layer 14 can be interchangeable, meaning that depending on how the geotextile composite is laid or put into use, pre-filter layer 12 can serve as a pre-filter or a post-filter as can the post-filter layer 14. Different embodiments of pre-filter layer 12 and post-filter layer 14 can comprise varying denier fibers and have a varying porosity therein, respectively, which can add to the tortuous paths that the fluids must go through as they pass through the geotextile composite 10.

Geotextile composite 10 further includes at least two intermediate filter layers 16, 18 disposed between pre-filter layer 12 and the post-filter layer 14. Intermediate filter layers 16, 18 can each comprise a nonwoven layer of fibers and/or yarns. For example, the intermediate filter layers 16, 18 can be needle-punched nonwovens, meltblown nonwovens, spun-bonded nonwovens, stitch-bonded nonwovens or the like. Each of the intermediate filter layers provide another layer of filtration through which the liquid being filtered must pass. Different embodiments of intermediate filter layers 16, 18 can comprise varying denier fibers and have a varying porosity therein, respectively, which can add to the tortuous paths that the fluids must go through as they pass through the geotextile composite 10.

Additionally, geotextile composite 10 can include at least one fibrous web 20 that includes composite fibers and adsorptive particulates 22. Fibrous web 20 is disposed between intermediate filter layers 16, 18. The adsorptive particulates 22 are distributed uniformly throughout the fibrous web relatively compactly to increase contact between the adsorptive particulates 22 and the contaminated liquids passing therethrough. In such a manner, the adsorptive particulates 22 have an opportunity to contact the contaminants and absorb them, thereby removing the contaminants from the liquid passing through the geotextile composite 10.

The adsorptive particulates 22 are immobilized in the fibrous structure by thermally bonding the adsorptive particulates to the composite fibers contained in fibrous web 20. In this manner, the adsorptive particulates stay evenly distributed through the fibrous web 20 within geotextile composite 10 such that any liquid passing through geotextile composite 10 will come into contact with the adsorptive particulate 22 within fibrous web 20. The composite fibers of the fibrous web 20 can have a structural component and thermally-bondable, polymeric component. The fibrous web 20 may pass through a heating process such that the thermally-bondable, polymeric component of the composite fiber melts to provide a thermal bonding of the adsorptive particulates 22 to the composite fibers. In this manner, the adsorptive particulates which are evenly distributed can be immobilized within fibrous web 20 without the addition of adhesives which can interfere and frustrate the adsorptive properties of the adsorptive particulates 22. In this manner, adhesives do not interfere with the adsorptive properties of the adsorptive particulates 22. The use of such adhesives can decrease the effectiveness of the adsorptive particulates due to the coating effect of the adhesives. In the present subject matter, the use of the thermally-bondable, polymeric component that thermally bonds the adsorptive particulates 22 within fibrous web 20 can be done with less or no interference to the adsorptive properties of the adsorptive particulates 22.

Intermediate filter layers 16, 18 can be separate layers from fibrous web 20 which can be attached through mechanical means such as thermal bonding, needle-punching or the like. Further, intermediate filter layers 16, 18 can actually comprise a portion of fibrous web 20 in which more fibers are contained on the top portion and bottom portion of fibrous web 20 to form a fibrous nonwoven mat on the top and bottom of fibrous web 20, which creates intermediate filter layers 16, 18.

Each component of geotextile composite 10 will be described in more detail below. For example, pre-filter layer 12 and/or post-filter layer 14 can comprise a needle-punched nonwoven, a thermally bonded nonwoven, stitchbonded nonwoven, a spunbond nonwoven, or the like. Further, pre-filter layer 12 and/or post-filter layer 14 can be a woven or knitted fabric.

The fibers and/or yarns used in pre-filter layer 12 and/or post-filter layer 14 can be synthetic or natural. For instance, the fibers and/or yarns can be polyesters, polyolefins, for example polypropylenes or polyethylenes, acrylics, polyamides, for example NYLON, or the like. The fibers and/or yarns can vary in mass per unit length depending on the embodiment. For example, the mass per unit length of fibers and/or yarns used in the pre-filter layer 12 can range from less than 1 denier to about 60 denier. The pre-filter layer 12 can have fibers and/or yarns of the same denier or a mixture of different deniers. Similarly, for example, the mass per unit length of fibers and/or yarns used in the post-filter layer 14 can range from less than 1 denier to about 25 denier. The post-filter layer 14 can have fibers and/or yarns of the same denier or a mixture of different deniers. Further, the pre-filter layer 12 and post-filter layer 14 can comprise fibers and/or yarns of the same denier or can comprise fibers and/or yarns of different denier. The selection of the type of fibers and/or yarns as well as their size as measured in mass per unit length can effect density and/or porosity of the respective layers 12, 14. Thus, the selection of the type of fibers and/or yarns has an effect on the permeability of such layers 12, 14.

For needle-punched nonwovens, each different nonwoven layer 12, 14 can be needle-punched. Different types of needles, different density of needles, different punches per square inch and different force can also effect density and/or porosity of the respective nonwovens. In this manner, different porosity can be created between the pre-filter layer 12 and post-filter layer 14, if desired.

Pre-filter layer 12 and post-filter layer 14 can thus have different permeability levels.

Further, in a similar fashion the two intermediate filter layers 16, 18 can also have different porosity to create different flow effects of the fluid passing through the geotextile composite 10. For example, the density, porosity, and amount of material within the respective intermediate filter layer 16, 18 can be different from the other intermediate filter layer 16, 18. As described above, intermediate filter layers 16, 18 can each comprise a nonwoven layer of fibers and/or yarns. The fibers and/or yarns can vary in mass per unit length depending on the embodiment. For example, the mass per unit length of fibers and/or yarns used in each intermediate filter layer 16, 18 can range from less than 1 denier to about 15 denier. Each intermediate filter layer 16, 18 can have fibers and/or yarns of the same denier or a mixture of different deniers.

Depending on the type of formation process (i.e., needle-punched nonwovens, meltblown nonwovens, spunbonded nonwovens, stitch-bonded nonwovens or the like) and the associated parameters of the process, the density, and porosity of each intermediate filter layer 16, 18 can also be effected. For example, for needle-punched nonwovens, different types of needles, different density of needles, different punches per square inch and different force can also effect density and/or porosity of respective layers 16, 18.

Intermediate filter layer 16 and intermediate filter layer 18 can thus have different permeability levels. Alternatively, the permeability levels of the respective intermediate filter layer 16, 18 can be the same.

In this manner, a multi-stage gradient density filter media can be created by geotextile composite 10 that can increase the contact of the liquid that is passing through geotextile composite 10 with the adsorptive particulate 22 by causing the fluid to flow through more indirect paths within geotextile composite 10. For example, pre-filter layer 12 can have a greater porosity than post-filter layer 14 to cause fluid passing through pre-filter layer 12 to stay in contact with adsorptive particulates 22 within fibrous web 20 for a longer period of time thereby increasing the chances of the adsorptive particulates 22 absorbing contaminants within the liquid passing through geotextile composite 10. Alternatively, pre-filter layer 12 and post-filter layer 14 can have a lesser porosity than the at least two intermediate filter layers 16, 18. In a similar manner, this keeps the fluid between the pre-filter layer and the post-filter layer for longer periods of time to increase the opportunity for the liquid passing through geotextile composite 10 to contact the adsorptive particulates 22 thereby increasing the opportunity to remove contaminants from the liquid. Thus, by varying the permeability of the pre-filter layer 12, post-filter layer 14, intermediate filter layer 16 and intermediate filter layer 18, a multi-stage gradient density filter media can be created with a depth load from intermediate layers 16, 18 to the post-filter layer 14.

Similarly, pre-filter layer 12 and post-filter layer 14 can range in weights and thicknesses and have different weights per unit area to affect both flow and filtration through the various layers. For example, pre-filter layer 12 and post-filter layer 14 can have a weight that ranges from about 70 grams per meter squared ("g\m²") to about 1000 g\m². For instance, pre-filter layer 12 and post-filter layer 14 can have a weight of about 270 g\m². The weight and/or thicknesses of the pre-filter layer 12 and post-filter layer 14 can differ from each other. The different weights of pre-filter layer 12 and post-filter layer 14 can affect the thicknesses of the respective layers. Further, the thicknesses of pre-filter layer 12 and post-filter layer 14 can be affected by the mechanical means of forming the respective layers which also affect the densities of the respective layers. Generally, geotextile composite 10 can range between about 3 mm and about 30 mm.

By using a polypropylene needle-punched nonwoven for both the pre-filter layer 12 and post-filter layer 14, a very strong and durable composite that is extremely resistant to puncture and tearing can be accomplished. Further, the polypropylene is inert to biological degradation and naturally encountered chemicals, alkalis, and acids. Such a strong durable fabric or nonwoven on the outsides of geotextile composite 10 protect fibrous web 20 containing the adsorptive particulates 22 which performs the removal of such contaminants as chemicals, alkalis, and acids that may be contained within the liquid passing through the geotextile composite 10.

Figure 2:
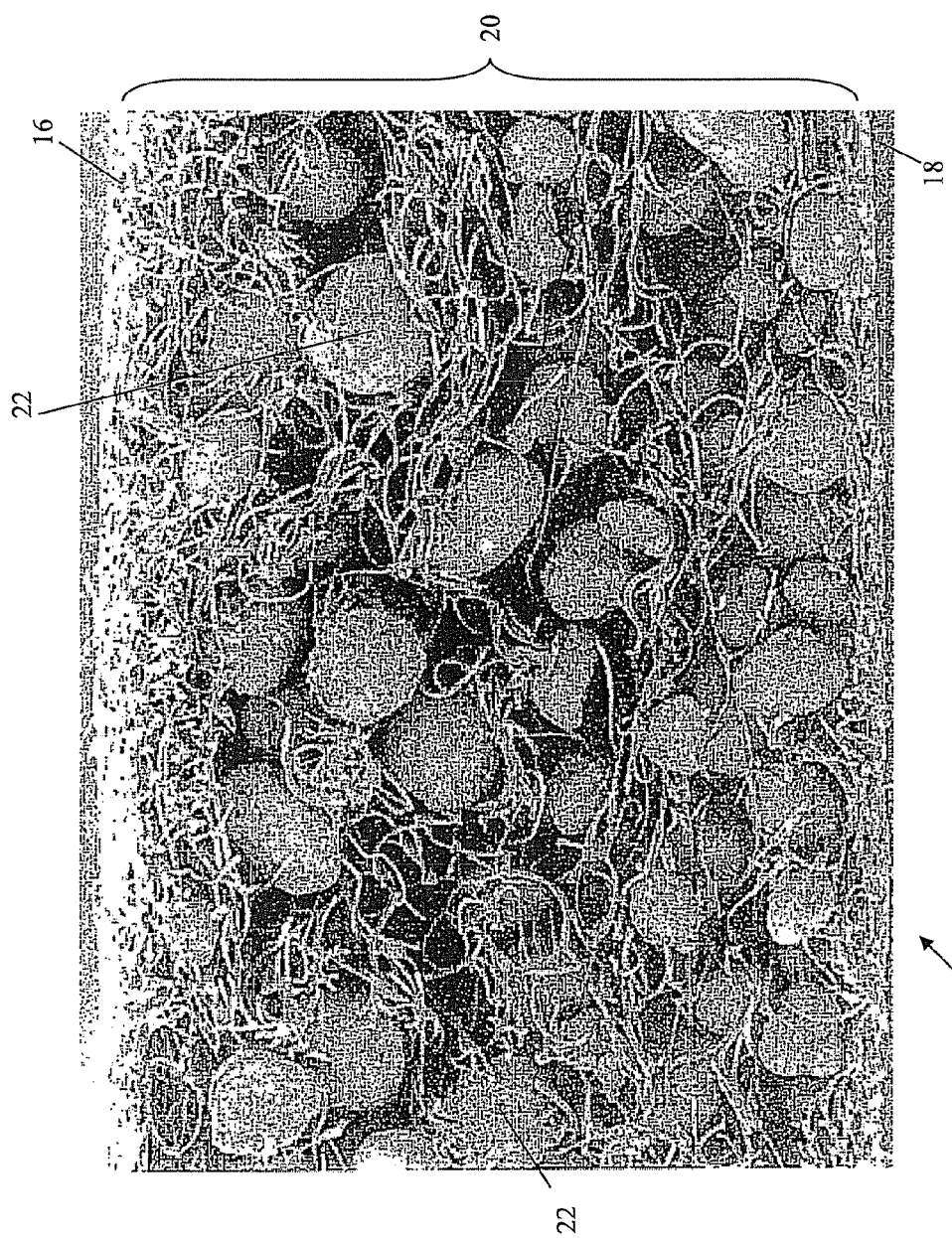
FIG. 2 illustrates an enlarged cross-sectional view through an embodiment of a composite structure that can be used in an embodiment of the geotextile composite according to the present subject matter.

As shown in FIG. 2, intermediate filter layers 16, 18 can be formed during the formation of fibrous web 20. Intermediate filter layer 16 and intermediate filter layer 18 contain a larger density of composite fibers which create the intermediate filter layers 16, 18. These fibers can have a structural component mixed with another thermally bondable component that melts at a lower temperature and bonds the fibers together. Similarly, as the web is being formed, adsorptive particulates 22 can be mixed in with the fiber to fill the middle layer with a uniform thickness of adsorptive particulates 22. Such adsorptive particulates 22 can be, for example, activated carbon, treated activated carbon, zeolite, potassium permanganate, silica beads, or the like. For example, activated carbon is a filtrate material which is beneficial in absorbing chemicals, alkalis and acids from fluids such as air and liquids. Treated activated carbon can be useful in absorbing mercury and ammonia. Activated carbon and silicon beads are useful in absorbing arsenic, cyanide and heavy metals. Thus, depending on the end use and/or the contaminants to be removed, different types of adsorptive particulates 22 can be used. Further, different layers, i.e., multiple fibrous webs 20, with different types of adsorptive particulates 22 can be used in the same geotextile composite 10.

The adsorptive particulates 22 can be held in place through the melting of the thermally bondable component of the composite fiber which can attach to the adsorptive particulates 22 and to other fibers to create a network, or matrix, around the adsorptive particulates 22 as well as causing the particulates to stick to the fibers contained within fibrous web 20, thereby immobilizing the particulates within fibrous web 20 and geotextile composite 10.

Figure 3A:
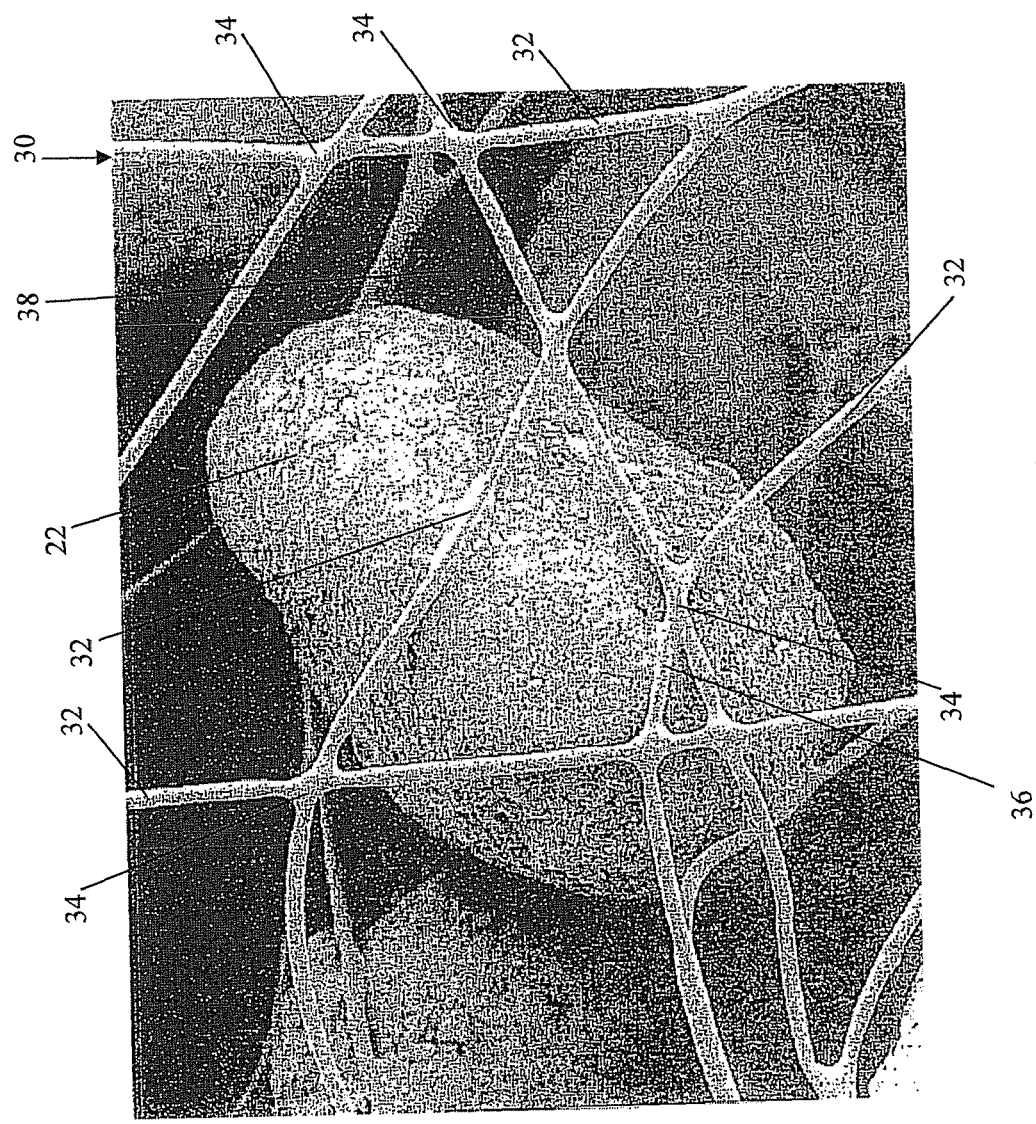
FIGS. 3A and 3B illustrate an enlarged view of a portion of an embodiment of a fibrous web that can be used in an embodiment of the geotextile composite according to the present subject matter.
Figure 3B:
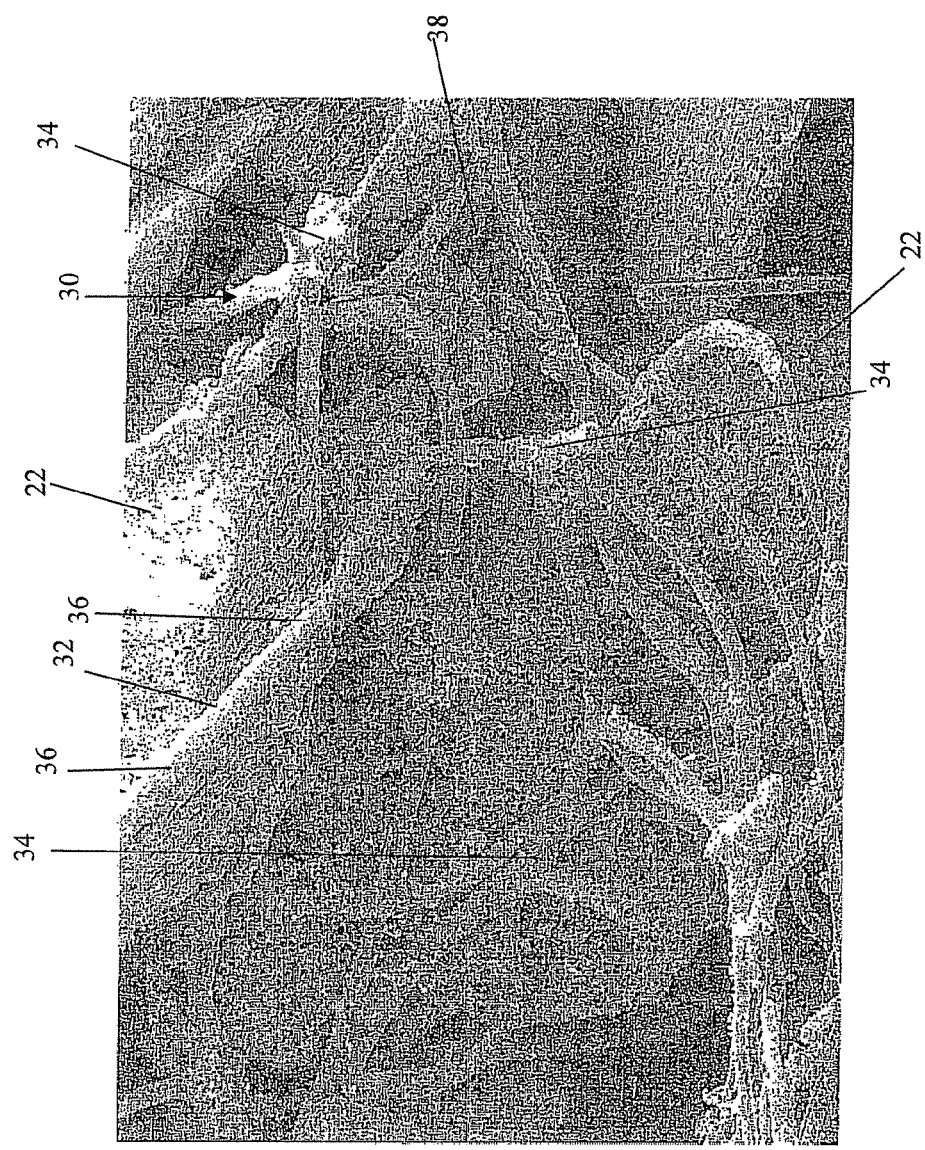

FIGS. 3A and 3B illustrate enlarged views of a close-up of fibrous web 20. As shown in FIGS. 3A and 3B, adsorptive particulates 22 are entrapped within and fusion bonded to a structural matrix generally designated 30. Structural matrix 30 can be formed by fibers 32 that are thermally bondable and that have been heat treated to thermally bond to each other at joints, or crossover points, 34. Further, the fibers 32 can also bond to the adsorptive particulates 22 at contact points 36 where the fibers contact the adsorptive particulates and have attached thereto during the heat treatment. In this manner, fibers 32 help to entrap the adsorptive particulates 22 in interstices 38 of the structural matrix place by the bonding of the fibers together at the crossover points 34 and the adsorptive particulates 22 are fused to individual fibers 32 at contact points 36 to preclude migration of the adsorptive particulates 22 out of the fibrous web 20. The contact points 36, while providing some holding power, do not coat the adsorptive particulates 22 as is normally done with an adhesive. Such coating limits the adsorptive particulates 22 effectiveness in absorbing contaminants when in use. Thereby, the use of structural matrix 30 within the fibrous web 20 to contain and immobilize the adsorptive particulates 22 in the fibrous web 20 increases the effectiveness of the adsorptive particulates 22 and thus the geotextile composite 10 described above.

The fibrous web 20 can be similar to and can be produced in a similar manner as the fibrous structures disclosed and described in U.S. Pat. No. 5,486,410, the disclosure of which is incorporated herein in its entirety. As indicated above, the fibrous web 20 comprises a particulate-immobilizing, fibrous matrix formed from composite fiber including a structure-forming component and a thermally-bondable, polymeric component. Beneficially, the structure-forming component can provide high structural integrity even when highly loaded with the adsorptive particulates, and the thermally-bondable component can have high bonding capability for fusion bonding of the particulate to the structural matrix. The composite fiber can lack latent crimpability characteristics which may tend to produce a distorted, non-uniform web structure upon thermal bonding.

Non-limiting examples of possible web structure-forming component include polyesters, which can be particularly useful as the web structure-forming component of a suitable composite, polymeric fiber. However, other web structure-forming, thermoplastic polymers or materials melting at a substantially higher temperature than the heat-bondable component of the composite fiber may be used. Generally speaking, the web structure-forming component melts at a temperature preferably at least about 30° C. to about 50° C. higher than the heat-bondable component.

Also useful in forming a composite fiber is a thermally-bondable, polymeric component. This thermally-bondable, polymeric component can provide a self-bonded, structural matrix upon appropriate treatment of the composite fibers. Advantageously, this component can be selected to optimize fusion bonding of adsorptive particulate matter to the web structure.

Competing considerations can govern suitability of the temperature at which the heat-bondable component melts. A relatively higher temperature generally requires relatively more energy for melting and generally requires a relatively higher melting web structure-forming component. Too low a temperature may result in product degradation or destabilization during use. In any event, the melt temperature should generally not be so high as to degrade or otherwise negatively affect the structural network or adsorptive particulate matter. For a polyester web structure-forming component, the melt temperature of the heat-bondable component can range from about 130° C. to about 200° C., for fiber-to-fiber and fiber-to-particulate bonding.

A suitable heat-bondable component of a useful composite fiber can have a defined melting point for fiber-to-particulate bonding. By comparison, polymeric materials having a wide melting range in excess of about 30° C. would generally not be useful. Accordingly, generally speaking, the narrower the melting point, the more suitable a heat-bondable component will be. Illustrative thermoplastic polymers having a sharp melting point include polyamides and polyesters, in particular homopolymers. A benefit of a sharp or defined melting point of less than 20° C., for example, less than about 12° C., is that fiber-to-fiber bonding and particulate-to-fiber bonding tend to be highly controllable. In determining whether a polymeric material has a sharp melting point, the melting point should generally be considered to begin when the material becomes soft and tacky and to end when the material is totally liquid.

A suitable heat-bondable component of a useful composite fiber can have adequate melt flow for strong bonding, in particular strong physical bonding, at elevated temperatures above its melting point, and yet have melt viscosity sufficient to preclude dripping or undesirable coating of the adsorptive particulate. Thus, a suitable heat-bondable component may have a relative viscosity of from about 0.8 to about 1.6, for example, from about 0.9 to 1.2, as measured in m-cresol.

Thermally-bondable components of a useful composite fiber can include thermoplastic polymers such as polyamides. A non-limiting example of a polyamide is NYLON-12, which melts over an about 10° C. range and hence has a sharp melting point. Other NYLONs useful with a structure-forming fiber component having a melting point in the range of from about 250° C. to 260° C., include NYLON-11. As one skilled in the art will recognize, a suitable thermally bondable component is not limited to polyamides. To the contrary, any other polymeric material may be selected that meets the foregoing requirements. Thus, any other polymeric material having a sharp melting point, having a significantly lower melting point than the web structure-forming component, and otherwise processable, for instance, beneficially melt spinnable and drawable, may be used.

Concentric sheath-core fibers are one example of composite fibers useful in the practice of the invention. Suitable composite fibers also include eccentric sheath-core fibers, and fibers having a side-by-side configuration. Composite fibers of these types are known as bicomponent or heterofil fibers.

The skilled artisan will recognize that a variety of composite fibers exist or may be made having a lower melting component as described, and that are suitable for use in the Fibrous web 20, and that a NYLON/polyester composite fiber is merely illustrative. A non-limiting example of a fiber that can be used is a spun heterofil fiber.

The composite fibers may be in a wide variety of forms including crimped and non-crimped cut staple fibers, short-cut staple, continuous filaments, and blends thereof. For example, a non-woven web structure may be formed from crimped composite fibers so as to be somewhat lofty for enhancing entrapment of the adsorptive particulates. The composite fibers can be typically macrofiber having an average diameter in excess of about 10 microns. A typical average diameter may be about 12 to 25 microns depending upon the intended application. The composite fibers can be present in an amount sufficient to form a three-dimensional structure that entraps the adsorptive particulates and that provides fusion bonding of the particulates to the web structure. The structure can be generally uniform to assist in three dimensional distribution and spacing of the particles. Binding of particulates to the fibrous matrix at more than one point, thereby minimizing particulate migration may be beneficially provided. However, generally speaking, it is advantageous for the particulate-immobilizing matrix to be present in a minor amount compared to the amount of adsorptive particulate matter.

Adsorptive particulate matter may range in size from about 1 micron for biocides and fungicides to about 3 to about 5 mm in average diameter, and may vary in shape from regularly shaped, spheroidal beads and cylinders to irregularly shaped particles. However, generally speaking, the particulate matter beneficially has an appropriate size to be entrapped by the web structure. For example, activated carbon particulates of about 400 to about 500 microns are suitable for entrapment in fibrous web 20 made from fibers having an average diameter of about 15 microns. Adsorptive particulate too small to be entrapped may be beneficially preheated and dispersed into the fibrous matrix for fusion bonding upon contact with matrix fibers. Additionally, reduction of size of void spaces generally results from the addition of adsorptive particulate; accordingly, smaller size, adsorptive particulate that would not be otherwise entrapped may be entrapped by first adding adsorptive particulate of appropriate size to be entrapped and thereafter added the smaller size, adsorptive particulate.

As stated above, while FIG. 2 shows the intermediate layer 16 and intermediate layer 18 as being integral to fibrous web 20, the intermediate filter layers 16, 18 can be a separate nonwoven layer which can be secured to fibrous web 20 through mechanical means such as needle punching, thermal bonding, stitching, or the like.

As shown in FIG. 2, intermediate filter layers 18 and fibrous web 20 can form a composite structure generally designated 24. Within each composite structure 24, the amount of adsorptive particulate 22 can vary between about 200 g\m$^2$ and about 1200 g\m$^2$. For example, an individual composite structure 24 or individual layer of fibrous web 20 can have amounts of adsorptive particulates 22 of about 200 g\m$^2$, about 400 g\m$^2$, about 600 g\m$^2$, about 800 g\m$^2$, and about 1200 g\m$^2$. The thickness of each composite structure 24 can vary depending on the amount of adsorptive particulates 22 therein. For example, a composite structure 24 of having about 400 g\m$^2$ of adsorptive particulates 22 can have a thickness of about 2 cm. In such embodiments, the amount of adsorptive particulate within a given geotextile composite can range from about 200 g\m$^2$ to 2400 g\m$^2$. To increase the mass per unit area of the adsorptive particulates 22, multiple composite structures 24 can be placed between pre-filter layer 12 and post-filter layer 14, thereby effectively stacking different adsorptive layers within a single geotextile composite. Examples of geotextile composites having multiple composite structures therein are explained in more detail below.

Figure 4:
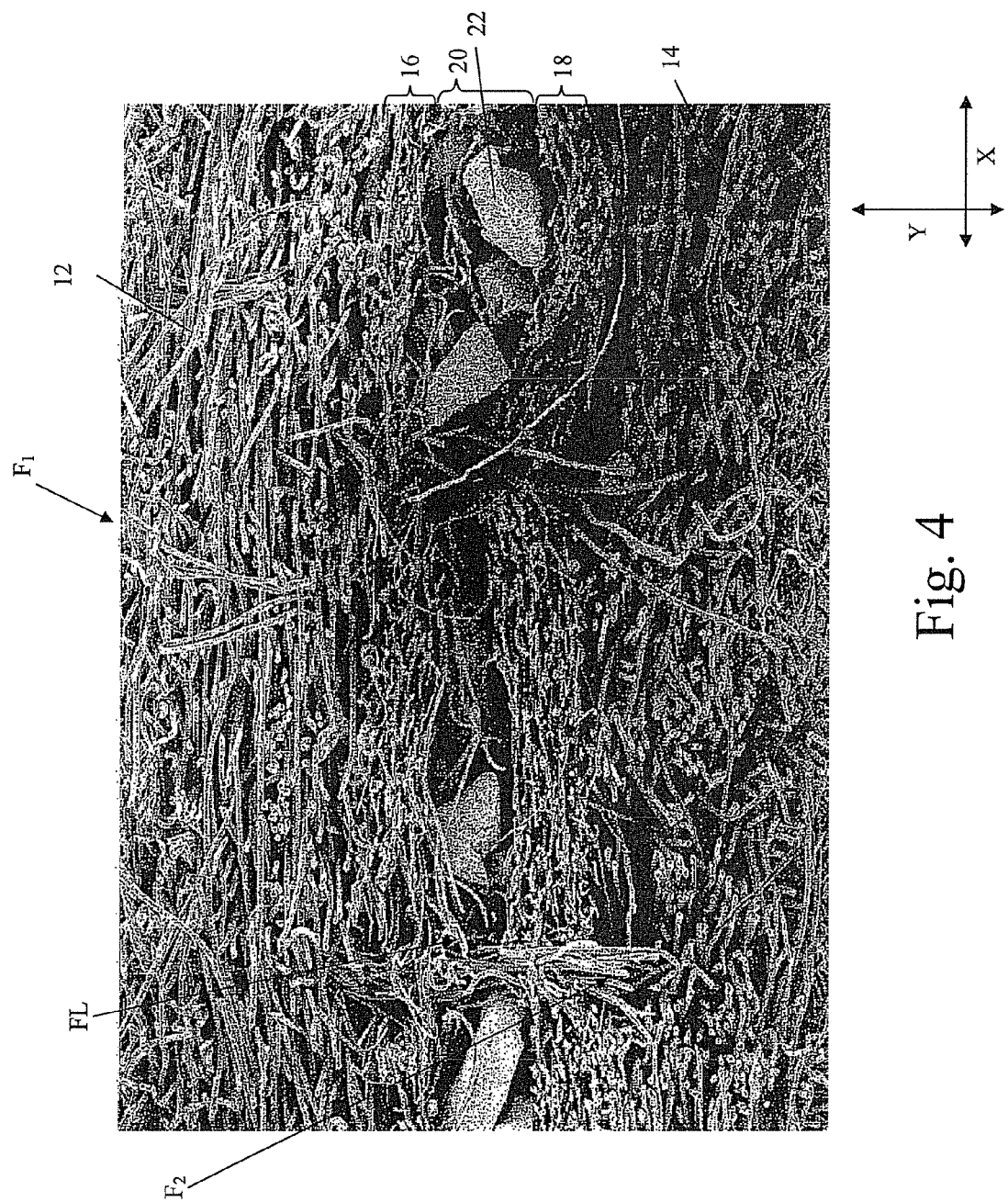
FIG. 4 illustrates an enlarged cross-sectional view through another embodiment of a geotextile composite according to the present subject matter.

As described above, the layers of geotextile composite 10 can be bonded together. For example, to hold the intermediate layers 16, 18 and fibrous web 20 to both the pre-filter layer 12 and the post-filter layer 14, the geotextile composite 10 can be mechanically bonded. For instance, the different layers can be needle-punched together. The needle-punching causes fibers from pre-filter layer 12 and post-filter layer 14 to extend into fibrous web 20 as well as each other to help whole the geotextile composite together. As shown in FIG. 4, as pre-filter layer 12, intermediate layers 16 and 18, fibrous web 20 and post-filter layer 14 can be oriented in a first direction with the fibers extending in a direction X the barbed needles of the needle punching machine force certain of those fibers in a generally perpendicular direction Y to the normal orientation direction X of the fibers.

For example, fibers are oriented in a direction X such as the fibers $F_1$ which are the normal orientation within the nonwoven fabric. The barbs on the needles of needle punching machine force certain fibers to at least partially extend in the direction Y such as fiber portions $F_2$. Fiber portions $F_2$ extend generally or about perpendicular to the original orientation of the fibers $F_1$. Generally, these fiber portions $F_2$ that extend in direction Y are really fibers $F_1$ that are bent such that a portion of them extend in the original orientation of the direction X and a portion extends in needle punched direction Y. These fibers extend on through and attach through friction to the other layers including the intermediate layers 16, 18, the fibrous layer 20 and the other of the either pre-filter layer 12 or post-filter layer 14. Thereby, these fibers create locking strands FL that hold the layers together (see also FIGS. 5B and 6).

Due to the structure of the fibrous web 20 and how the adsorptive particulates 22 are secured therein, the use of needle-punching to secure the layers of geotextile composite 10 creates a strong bond between the layers without creating non-uniform distribution of the adsorptive particulates 22 in the fibrous web 20 or without generating excessive dust from interaction of the needles with the adsorptive particulates 22. For example, carbon dust is a concern when handling activated carbon as an adsorptive particulate. When used in the fibrous web 20 of the geotextile composite 10, the activated carbon as adsorptive particulate 22 does not create excessive dust that would interfere with the manufacturing of the geotextile composite 10 during needle punching or handling of the geotextile composite 10 thereafter.

Due to the minuteness of holes created by the needle-punching and to the torturous paths for flow within the geotextile composite, the liquid which may travel along portion of the fibers extending in the direction Y have a tendency to spread out within fibrous web 20 and contact the adsorptive particles 22 to prevent a large flow of liquid through geotextile composite 10 which still contains contaminant which does not come in contact with the adsorptive particles 22.

Figure 5A:
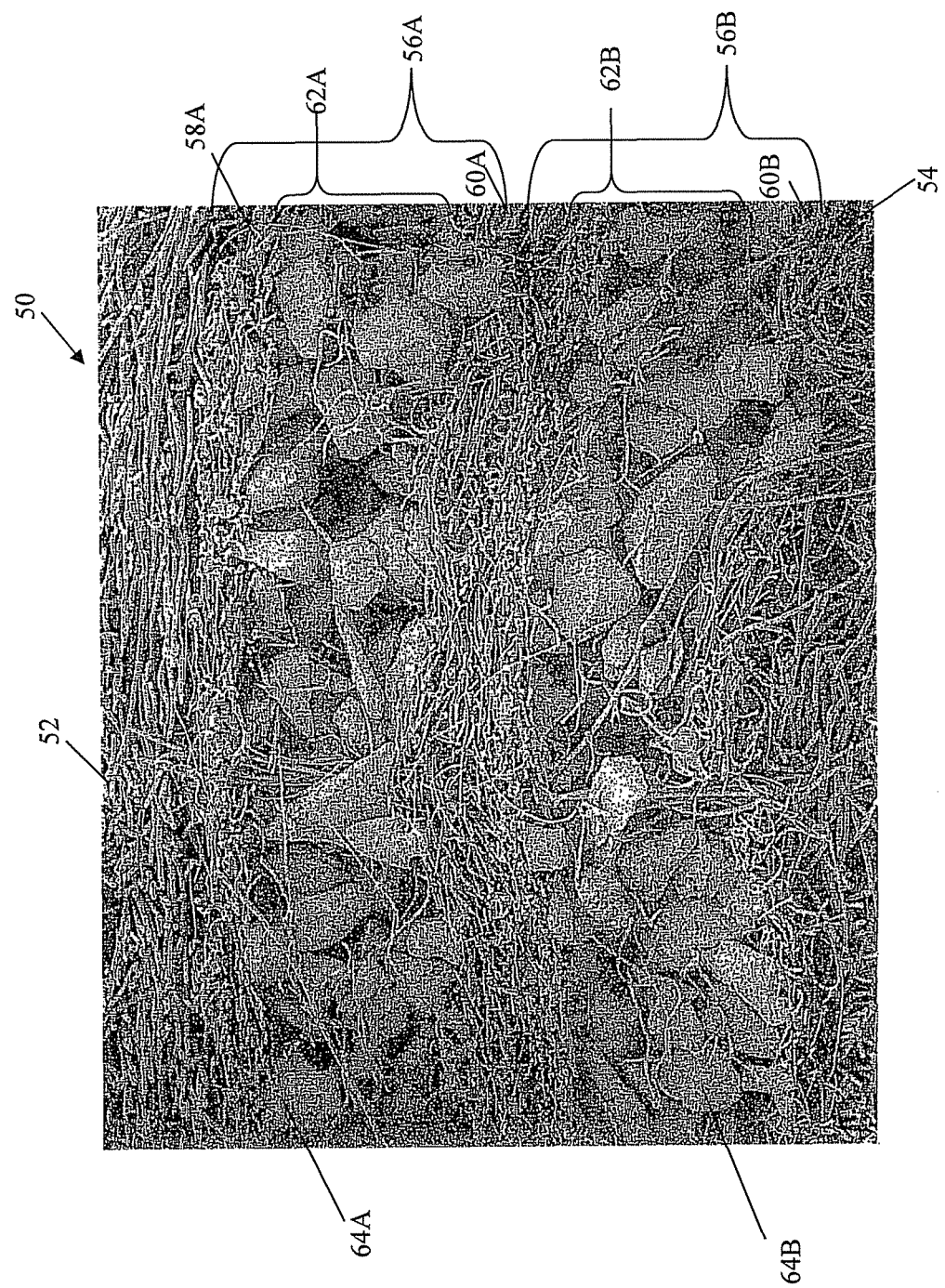
FIGS. 5A and 5B illustrate an enlarged cross-sectional view through another embodiment of a geotextile composite according to the present subject matter.
Figure 5B:
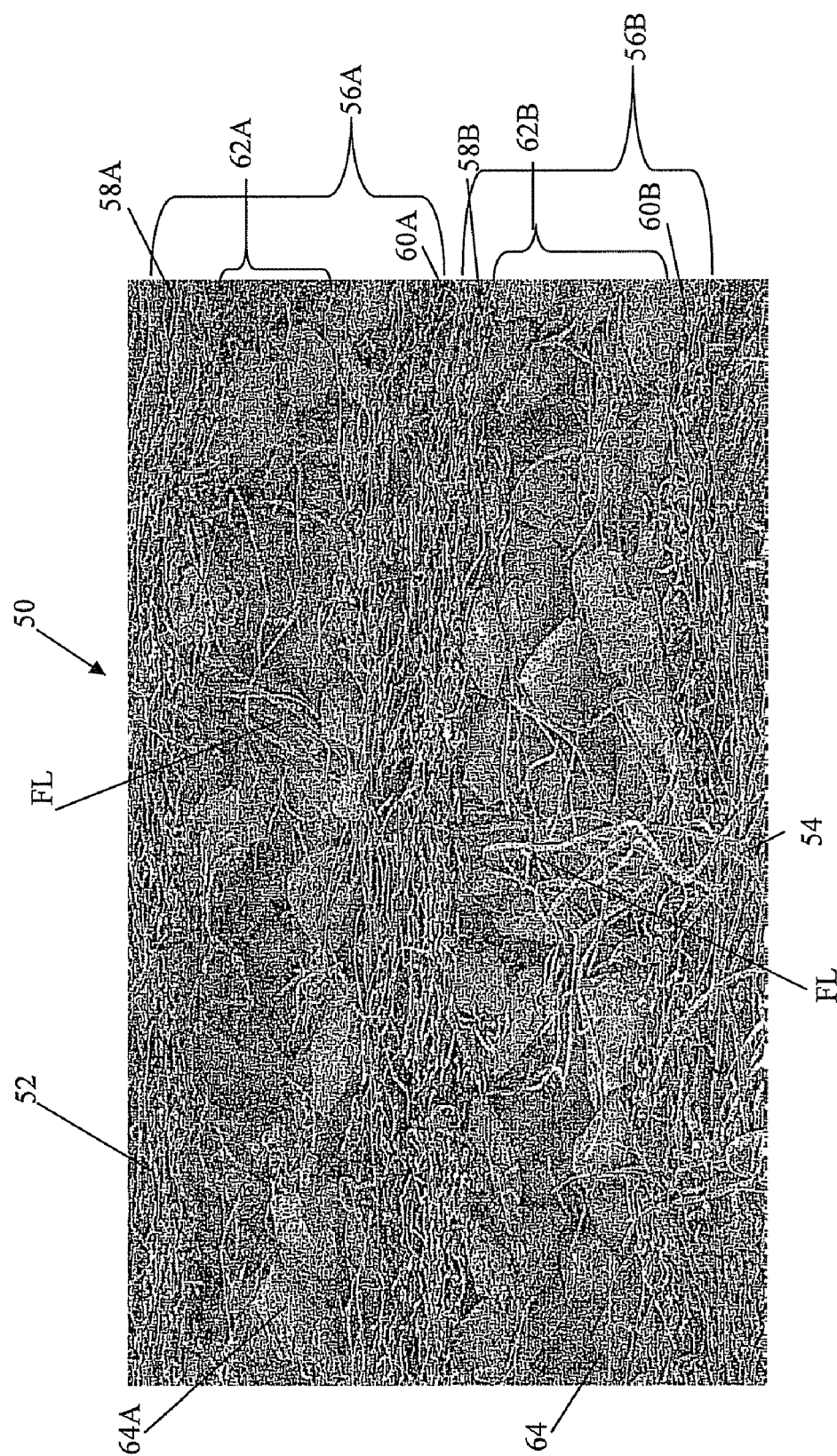

FIGS. 5A and 5B show an embodiment of a geotextile composite generally designated 50 that includes a pre-filter layer 52 and a post-filter layer 54. Between pre-filter layer 52 and post-filter layer 52, two composite structures 56A and 56B are positioned with composite structure 56A disposed atop composite structure 56B. Composite structure 56A includes a top intermediate layer 58A and a bottom intermediate layer 60A with a fibrous web layer 62A with adsorptive particles 64A therein between top intermediate layer 58A and bottom intermediate layer 60A. Composite structure 56B includes a top intermediate layer 58B and a bottom intermediate layer 60B with a fibrous web layer 62B with adsorptive particles 64B therein between top intermediate layer 58B and bottom intermediate layer 60B.

Fibrous web layers 62A, 62B operates in a similar manner and formed in a similar manner as the fibrous web 20 (see FIG. 1) described above. In the embodiment shown in FIGS. 5A and 5B, two different layers of uniformly distributed and immobilized adsorptive particles 64A, 64B provide uniform coverage throughout geotextile composite 50. Each layer can comprise approximately 400 g\m$^2$ of adsorptive particulates such as activate carbon, silicon beads, adsorptive clays or the like. However, in some embodiments, each composite structure 56A, 56B can comprise between about 200 g\m$^2$ and about 1200 g\m$^2$ of adsorptive particulates 64A, 64B.

Thereby, the adsorptive material contained within geotextile composite 50 can be two or more times as much as the adsorptive material contained in the geotextile composite 10 (see FIG. 1) described above. The geotextile composite 50 has increased sized but also has increased adsorptive powers to remove more contaminants from liquid flowing therethrough. The flow of the liquid through geotextile composite 50 can be further influenced by the increased number of layers contained therein such that the flow rate is belong and the liquid stays in contact with the adsorptive particulates 64A, 64B for long periods. In such an embodiment, the various layers can be held together through any number of mechanical bonding methods including needle punching, for example.

Figure 6:
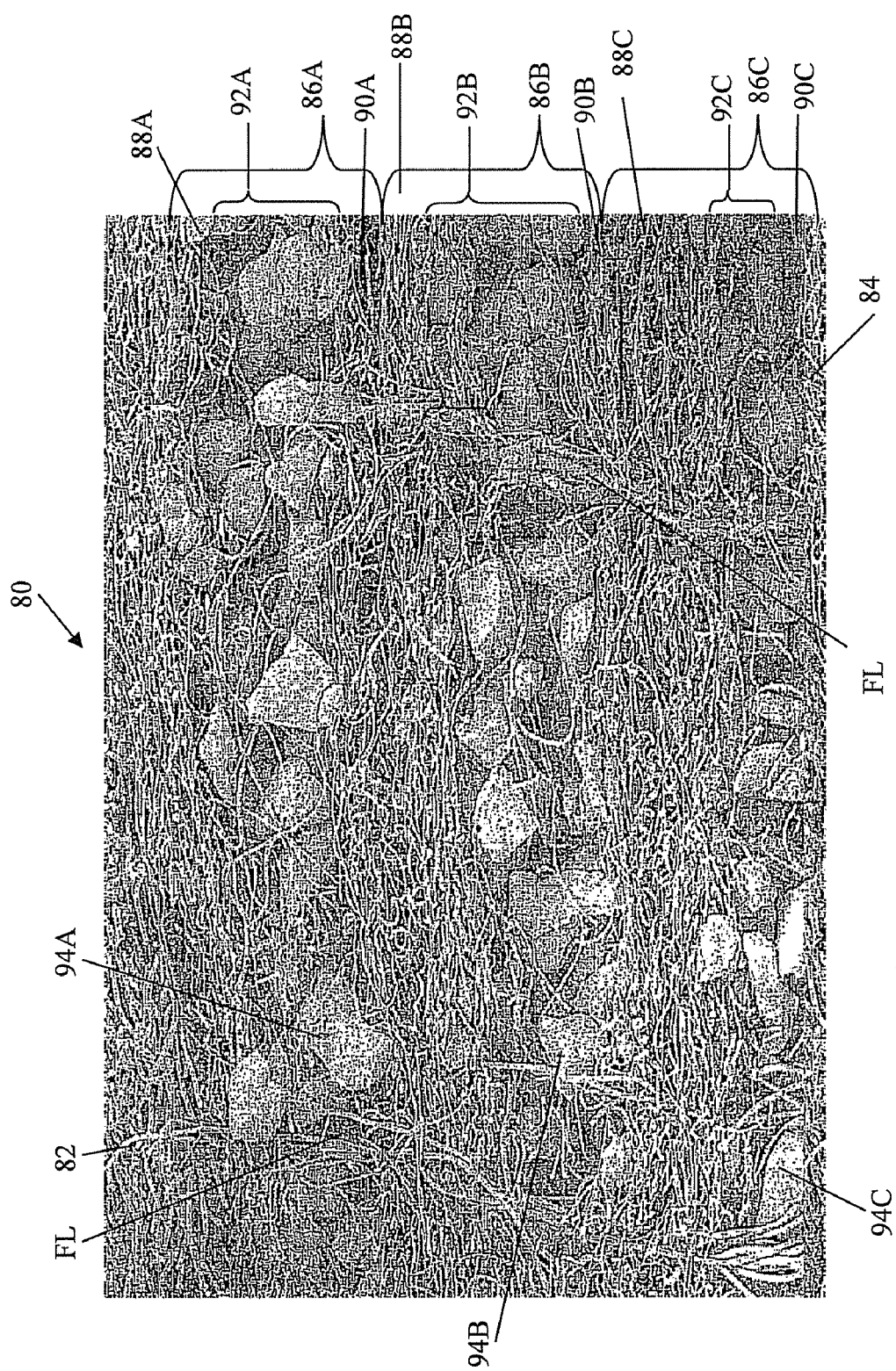
FIG. 6 illustrates an enlarged cross-sectional view through a further embodiment of a geotextile composite according to the present subject matter.

FIG. 6 show an embodiment of geotextile composite generally designated 80 which includes a pre-filter layer 82 and a post-filter layer 84. Between pre-filter layer 82 and post-filter layer 84, three composite structures 86A, 86B, 86C are disposed on top of each other in succession. As above, each composite structure 86A, 86B, 86C respectively includes a top intermediate layer 88A, 88B, 88C and a bottom intermediate layer 90A, 90B, 90C. Between the respective top intermediate layer 88A, 88B, 88C and bottom intermediate layer 90A, 90B, 90C, a fibrous web layers 92A, 92B, 92C can be disposed with the respective fibrous web layer 92A, 92B, 92C having adsorptive particulates 94A, 94B, 94C therein. The adsorptive particulates 94A, 94B, 94C are uniformly distributed within the respective fibrous web layer 92A, 92B, 92C. Further, the structure of fibrous web layers 92A, 92B, 92C immobilize the respective adsorptive particulates 94A, 94B, 94C to hold the adsorptive particulates 94A, 94B, 94C in place during both handling and use. In such a manner, fibrous web layers 92A, 92B, 92C provide uniform coverage throughout the geotextile composite 80 of the desired adsorptive particulates 94A, 94B, 94C to create a comprehensive filter layer with each composite structure 86A, 86B, 86C with the geotextile composite 80.

In the shown embodiment, each composite structure 86A, 86B, 86C can comprise approximately 400 g\m² of adsorptive particulates 94A, 94B, 94C such as activate carbon, silicon beads, adsorptive clays or the like. However, in other embodiments, each composite structure 86A, 86B, 86C can comprise between about 200 g\m² and about 800 g\m² of adsorptive particulates 94A, 94B, 94C. Thereby, the amount of adsorptive particles 94A, 94B, 94C contained within geotextile composite 80 can be three or more times as much as the amount of adsorptive particles contained in the geotextile composite 10 described above. As with the geotextile composite 50, the geotextile 80 has increased sized but also has increased adsorptive powers to remove more contaminants from liquid flowing therethrough. The flow of the liquid through geotextile composite 80 can be further influenced by the increased number of layers contained therein such that the flow rate is belong and the liquid stays in contact with the adsorptive particulates 94A, 94B, 94C for long periods. In such an embodiment, the various layers can be held together through any number of mechanical bonding methods including needle punching, for example.

The geotextile composites described above can be easily handled and can be oriented in either a horizontal or a vertical direction without compromising its effectiveness. Such geotextile composites can have water filtration efficiencies of 2 microns or greater with 50 microns or greater achieving 99% efficiencies as measured by the ASTM-D 795-88 test, incorporated herein by reference. For example, the geotextile composites can have water filtration efficiencies between about 2 microns to about 80 microns.

Figure 7:
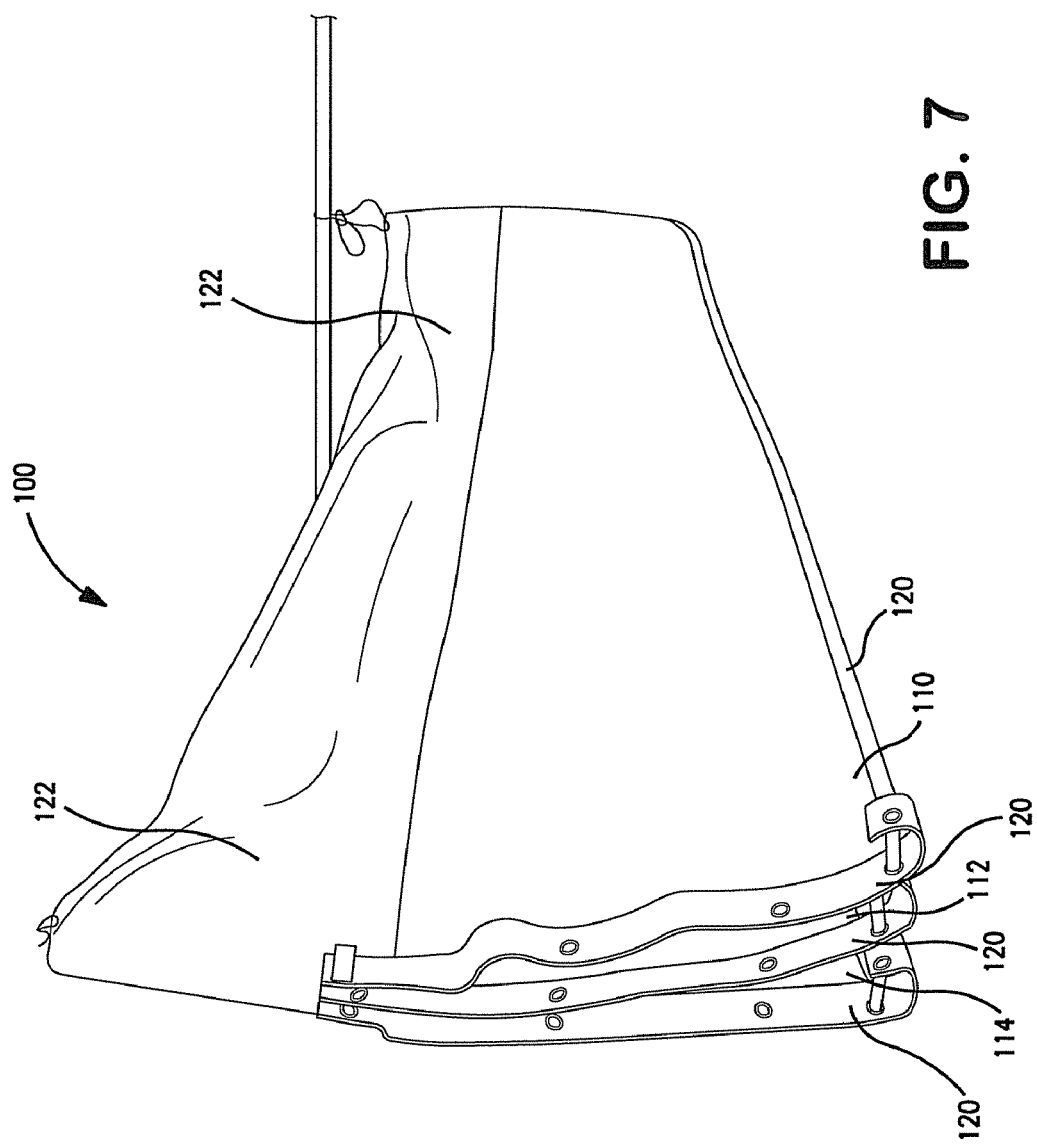
FIG. 7 illustrates an embodiment of a turbidity curtain that employs an embodiment of a geotextile composite according to the present subject matter.

FIG. 7 illustrates a turbidity curtain generally designated 100 that can be used in flowing body of liquid such as a river, lake or creek. Turbidity curtain 100 can include at least one geotextile composite 110 through which the liquid can flow to provide filtration to at least a portion of the body of liquid. As shown in FIG. 7, turbidity current 100 can include multiple geotextile composites 110, 112, 114.

Each geotextile composite 110, 112, 114 can include a structure as described with reference to the embodiments above. For example, each geotextile composite 110, 112, 114 can include a pre-filter layer which faces the liquid to be filtered and a post-filter layer which resides on the opposite side of the respective geotextile composite 110, 112, 114 from the pre-filter layer. Both the pre-filter layer and the post-filter layer can be nonwoven structures formed in a conventional manner through processing of fibers. For example, the pre-filter layer and the post-filter layer can be a needle-punched nonwoven.

Each geotextile composite 110, 112, 114 further includes at least two intermediate filter layers disposed between the pre-filter layer and the post-filter layer. The intermediate filter layers can each comprise a nonwoven layer of fibers. Each geotextile composite 110, 112, 114 can include at least one fibrous web that includes composite fibers and adsorptive particulates as described above. The fibrous web is disposed between the intermediate filter layers of each geotextile composite 110, 112, 114. As described above, the adsorptive particulates are uniformly and relatively compactly distributed throughout the fibrous web to increase contact between the adsorptive particulates and the contaminated liquids passing therethrough such that the adsorptive particulates have an opportunity to contact the contaminants and adsorb them, thereby removing the contaminants from the liquid passing through each geotextile composite 110, 112, 114.

In each geotextile composite 110, 112, 114, the intermediate filter layers can be separate layers from the fibrous web that can be attached together through mechanical means such as thermal bonding, needle-punching or the like. Further, the intermediate filter layers can comprise a portion of the fibrous web in which more fibers are contained on the top portion and bottom portion of the fibrous web to form a fibrous nonwoven mat on the top and bottom of the fibrous web which creates the intermediate filter layers.

Turbidity curtain 100 can also include a hemming 120 that extends around each geotextile composite 110, 112, 114. Hemming 120 can, for example be a liquid impervious material that forces the liquid to flow around it through the respective geotextile composite 110, 112, 114. Hemming 120 can also extend upward and create pockets or passageway into which floatation devices 122 such as buoys or other floatable material can be placed. Alternatively, such passageways can receive a stabilizing device such as a pole therein to hold at least the top portion of the turbidity curtain 100 in proper position during its deployment in a body of liquid.

Further, brackets can extend from the upper portion of hemming 120 of turbidity curtain 100 to aid in maintaining turbidity curtain 100 in its position in the field. Further, the hemming 120 along the sides of the each geotextile composite 110, 112, 114 can have ringlets therein to permit the different geotextile composites 110, 112, 114 to be secured in close proximity to one another to increase the effectiveness of the filtering of the body of liquid into which it is placed.

Figure 8:
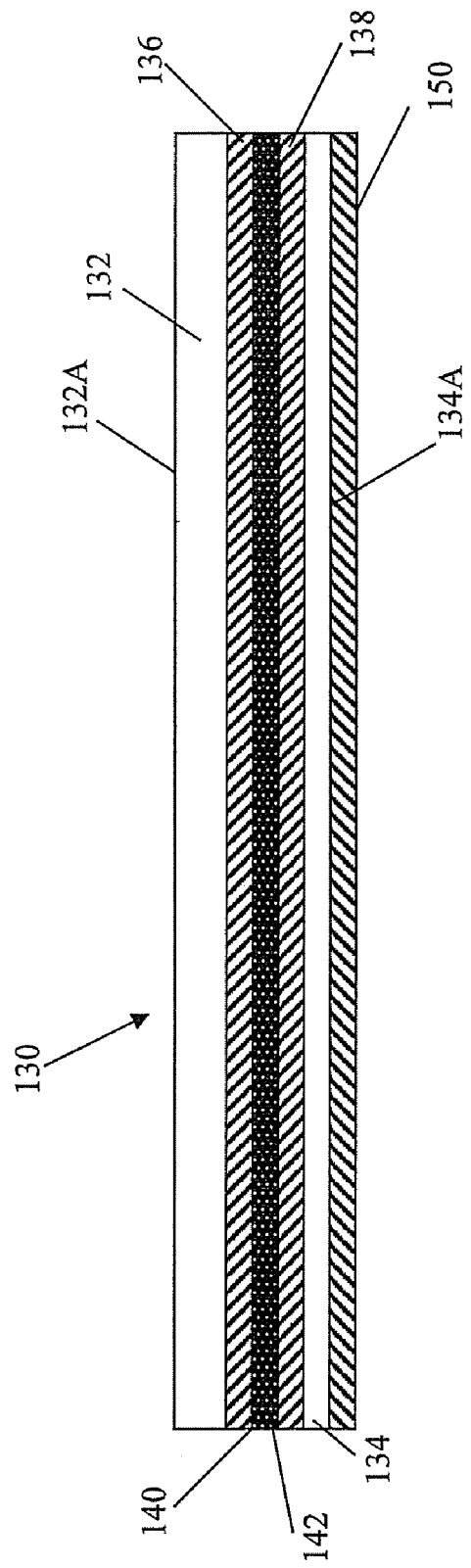
FIG. 8 illustrates a schematic cross-sectional view through an additional embodiment of a geotextile composite according to the present subject matter.

To increase the durability and to enhance other characteristics of the geotextile composites described above, a reinforcement layer can be added to either the pre-filter layer or the post-filter layer of the respective geotextile composite. For example, FIG. 8 illustrates an embodiment of a geotextile composite generally designated 130 that can be used to filter liquids and has a reinforcement layer 150 secured thereto. As with the geotextile composites described above, geotextile composite 130 includes a pre-filter layer 132 and a post-filter layer 134 which resides on the opposite side of geotextile composite 130 from pre-filter layer 132. Both pre-filter layer 132 and post-filter layer 134 can be nonwoven fabrics formed in a conventional way through processing of fibers. The pre-filter layer 132 and post-filter layer 134 can include thermoplastic fibers such as polyesters, polyolefins, for example polypropylenes or polyethylenes, acrylics, polyamides, for example NYLON, or the like. Pre-filter layer 132 and post-filter layer 134 can be a needle-punched nonwoven, a thermal bonded nonwoven, a spunbonded nonwoven, a stitchbonded nonwoven or the like.

Geotextile composite 130 further includes at least two intermediate filter layers 136, 138 disposed between pre-filter layer 132 and the post-filter layer 134. Intermediate filter layers 136, 138 can each comprise a nonwoven layer of fibers. For example, intermediate filter layers 136, 138 can include thermoplastic fibers such as polyesters, polyolefins, for example polypropylenes or polyethylenes, acrylics, polyamides, for example NYLON, or the like. Such nonwoven fabrics can be needle-punched nonwovens, meltblown nonwovens, spunbonded nonwovens, stitch-bonded nonwovens or the like. Alternatively, intermediate filter layers 306, 308 can each comprise a woven or knitted fabric. Each of the intermediate filter layers provide another layer of filtration through which the liquid being filtered must pass.

Additionally, geotextile composite 130 can include at least one fibrous web 140 that includes composite fibers and adsorptive particulates 142. Fibrous web 140 is disposed between intermediate filter layers 136, 138. The adsorptive particulates 142 are uniformly and relatively compactly distributed throughout fibrous web 140 to increase contact between the adsorptive particulates 142 and the contaminated liquids passing therethrough. In such a manner, the adsorptive particulates 142 have an opportunity to contact the contaminants and absorb them, thereby removing the contaminants from the liquid passing through the geotextile composite 130.

The adsorptive particulates 142 are immobilized in the fibrous structure by thermally bonding the adsorptive particulates to the composite fibers contained in fibrous web 140 as described above. In this manner, the adsorptive particulates stay evenly distributed through the fibrous web 140 within geotextile composite 130 such that any liquid passing through geotextile composite 130 will come into contact with the adsorptive particulate 142 within fibrous web 140.

Geotextile composite 130 also includes reinforcement layer 150 that can be secured to geotextile composite 130 to add high strength characteristics. The reinforcement layer 150 can be disposed on the outer side 134A of post-filter layer 134 as shown in FIG. 8. If the reinforcement layer 150 is porous enough, it can be positioned on the outer side 132A of pre-filter layer 132. Alternative, reinforcement layer can be disposed between per-filter layer 132 and post-filter layer 134. For example, reinforcement layer 150 can be disposed between intermediate layer 138 and post-filter layer 134.

Reinforcement layer 150 can include at least one of a woven geotextile, a knitted geotextile, a geotextile grid, or a combination thereof. For instance, a woven PET geotextiles such as COMTRAC sold by Huesker, Inc., of Charlotte can be used as a reinforcement layer 150. Further, a geotextile grid such as FORTRAC also sold by Huesker, Inc., of Charlotte can be used as a reinforcement layer 150. Further, woven or knitted geotextiles can be used to facilitate the use of the geotextile composite as a geotextile tube that are useful in prevention of erosion and to permit the geotextile tube to serve as a filter of the liquid being pumped therein during use. Woven or knitted geotextiles that have high strength can be used, giving the geotextile composite high strength, for example, about 35 to about 500 kN/m.

To facilitate the use in the field of geotextile composites described herein, the geotextile composites can be colored to give a warning to observers. For example, specific colors can be used to give specific warnings.

Another benefit of using the geotextile composites described herein is that is it can be manufactured in large sizes. Normally, with geotextiles, different panels need to be secured together to make a large sheet used in geo-environments. These panels are normally a width of about 2 m to about 5 m wide. The stability of the geotextile composites disclosed herein permits a much wider panel to be made. For example, the geotextile composites disclosed herein can be produced in widths of 9 m or larger depending on the limitation of the manufacturing machines such as the needle-puncher. Thus, a panel or roll of the geotextile composite can be easily made up to about 9 m in width and about 100 m or more in length; for instance, about 200 m in length. In this manner, fewer panels are used providing better continuity in the final sheet used in the geo-environment. Also, the stability of the above described geotextile composites permits different panels to be secured together in a number of ways. For example, panels of the geotextile composites can be secured together by sewing, needle punching, thermal bonding or other mechanical bonding. Further, panels of the geotextile composite can be secured together through chemically bonding.

Figure 9:
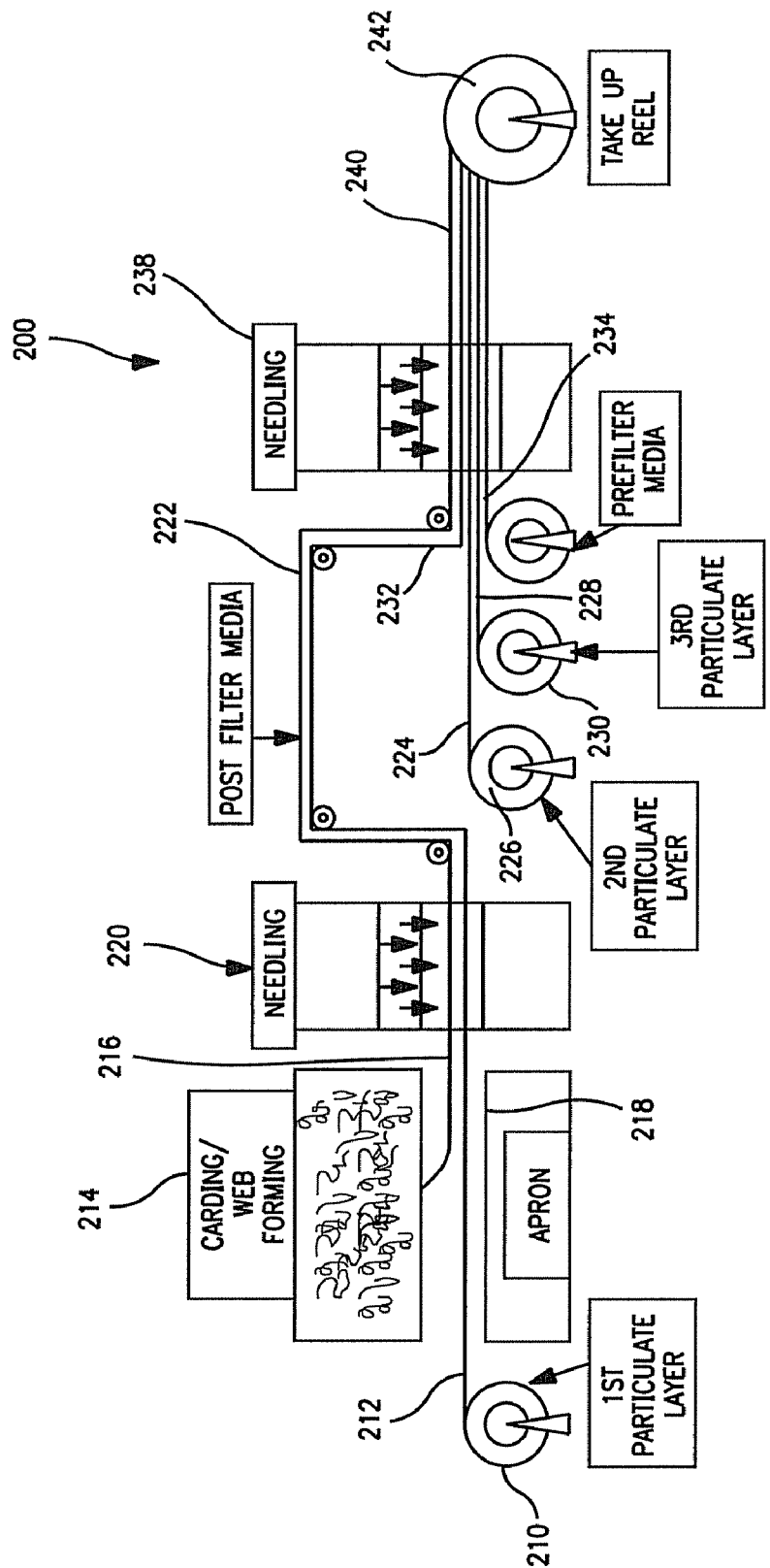
FIG. 9 illustrates a schematic of an embodiment of a process use to produce an embodiment of a geotextile composite according to the present subject matter.

FIG. 9 illustrates an example of how a geotextile composite described above is made in a process line generally designated 200. In the example process line 200, a roll 210 of a first composite structure 212 is provided. First composite structure 212 is feed into the process line 200 where a web formation process 214, such as a carding process, distributes a web 216 of staple length fibers onto composite structure 212 with apron 218 below for support. Web 216 and first composite structure 212 pass through a needle punching process 220 which secures web 216 to first composite structure 212 and, at the same time, creates a post-filter layer 222 from web 216. During the needle punching process 220, the needles apply a downward force from the post-filter layer 222 through the pre-filter layer 212. In the example shown, a second composite structure 224 is feed from a roll 226 and a third composite structure 228 is feed from a roll 230 into the process line 200 such that the composite structures 224, 228 align on the side 232 of first composite structure 212 opposite the post-filter layer 222. The preformed pre-filter layer 234 can then be feed from a roll 236 on a side of third composite structure 228 opposite the second composite structure 224. The post-filter layer 222, first composite structure 212, second composite structure 224, third composite structure 228, and the pre-filter layer 234 can then be feed into a second needle punching process 238 such that the needles extend downward from the post-filter layer 222 to the pre-filter layer 212 forming a geotextile composite 240. Geotextile composite 240 exits the process line 200 and is rolled onto a beam 242. In this manner, a wide and long panel of geotextile composite 240 can be formed.

Figure 10:
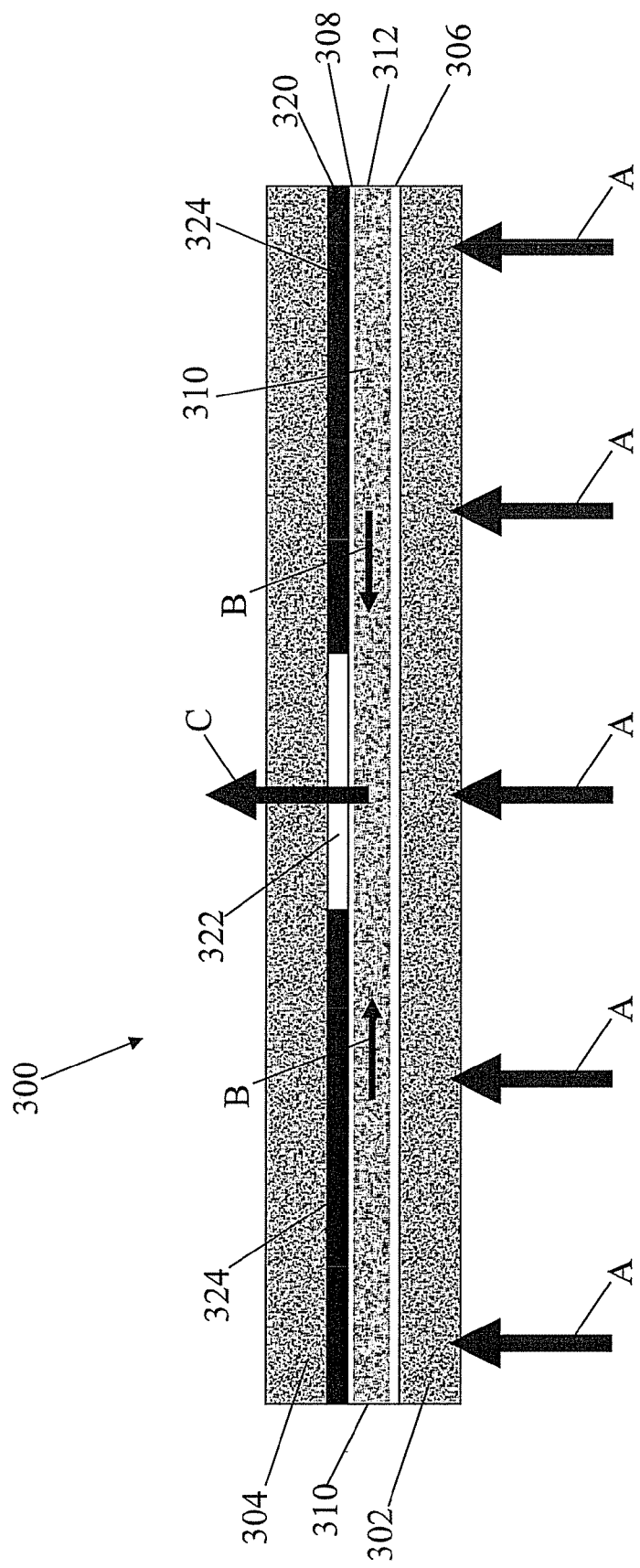
FIG. 10 illustrates a schematic cross-sectional view through a further embodiment of a geotextile composite including a vented diversion layer according to the present subject matter.
Figure 11:
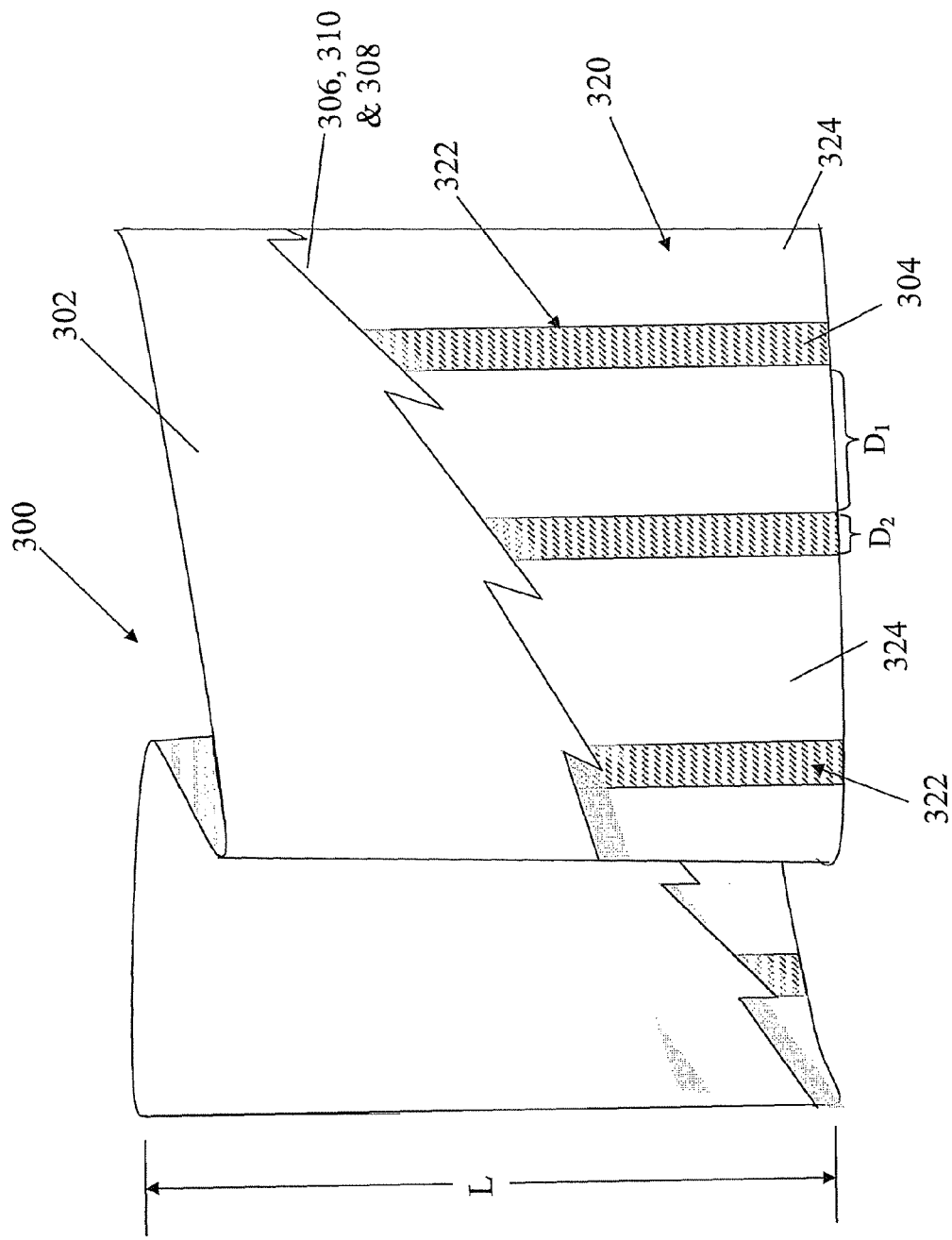
FIG. 11 illustrates a schematic cut-away top view of a portion of the embodiment of the geotextile composite illustrated by FIG. 10.

FIGS. 10 and 11 illustrate a further embodiment of a geotextile composite generally designated 300 that can be used to filter liquids and increase exposure and contact between the adsorptive particulates and the liquids and/or sediments therein with a venting system. As with the geotextile composites described above, geotextile composite 300 includes a pre-filter layer 302 and a post-filter layer 304 which resides on the opposite side of geotextile composite 300 from pre-filter layer 302. Both pre-filter layer 302 and post-filter layer 304 can be nonwoven fabrics formed in a conventional manner through processing of fibers. The pre-filter layer 302 and post-filter layer 304 can include thermoplastic fibers such as polyesters, polyolefins, for example polypropylenes or polyethylenes, acrylics, polyamides, for example NYLON, or the like. Pre-filter layer 302 and post-filter layer 304 can be a needle-punched nonwoven, a thermal bonded nonwoven, a spunbonded nonwoven, a stitchbonded nonwoven or the like.

Geotextile composite 300 further includes at least two intermediate filter layers 306, 308 disposed between pre-filter layer 302 and the post-filter layer 304. Intermediate filter layers 306, 308 can each comprise a nonwoven layer of fibers. For example, intermediate filter layers 306, 308 can include thermoplastic fibers such as polyesters, polyolefins, for example polypropylenes or polyethylenes, acrylics, polyamides, for example NYLON, or the like. Such nonwoven fabrics can be needle-punched nonwovens, meltblown nonwovens, spunbonded nonwovens, stitch-bonded nonwovens or the like. Alternatively, intermediate filter layers 306, 308 can each comprise a woven or knitted fabric. Each of the intermediate filter layers provide another layer of filtration through which the liquid being filtered must pass.

Additionally, geotextile composite 300 can include at least one fibrous web 310 that includes composite fibers and adsorptive particulates 312. Fibrous web 310 is disposed between intermediate filter layers 306, 308. The adsorptive particulates 312 are uniformly and relatively compactly distributed throughout fibrous web 310 to increase contact between the adsorptive particulates 312 and the contaminated liquids and/or sediments passing therethrough. In such a manner, the adsorptive particulates 312 have an opportunity to contact the contaminants and absorb them, thereby removing the contaminants from the liquid and/or sediments passing through the geotextile composite 310.

The adsorptive particulates 312 are immobilized in the fibrous structure by thermally bonding the adsorptive particulates to the composite fibers contained in fibrous web 310 as described above. In this manner, the adsorptive particulates stay evenly distributed through the fibrous web 310 within geotextile composite 300 such that any liquid and/or sediments passing through geotextile composite 300 will come into contact with the adsorptive particulate 312 within fibrous web 310.

To further increase the level of contact between adsorptive particulates 312 and contaminated liquids and/or sediments passing through the geotextile composite 300, a vented diversion layer 320 having vents 322 therein between panel sections 324 can be disposed between pre-filter layer 302 and post-filter layer 304. For example, vented diversion layer 320 can be disposed between fibrous web layer 310 and post-filter layer 304. For instance, vented diversion layer 320 can be disposed between intermediate layer 308 and post-filter layer 304.

Vented diversion layer 320 can be liquid-impermeable or have a much lower permeability than the other layers included in geotextile composite 300. For example, the vented diversion layer 320 can be a liquid-impermeable thermoplastic film or a low permeable nonwoven, woven, or knitted geotextile. For instance, panel sections of impermeable film can be secured to a porous substrate with space provided between the panel sections to create vents 322. Further embodiments can be created by having a nonwoven that comprises different densities and porosities therein to create different permeability levels at different locations within the nonwoven. Another example of a vented diversion layer can be a fibrous web structure similar to the fibrous web 20 (see FIG. 1) described above. However, instead of adsorptive particulates therein, particles of super absorbent polymers can be used with the fibrous web having panel sections that contain particles of super absorbent polymers and vents within the fibrous webs that contain fibers but no super absorbent polymers. In such embodiments, as the particles of super absorbent polymers that are evenly and relatively compactly distributed within the panel sections absorb the liquids passing through the geotextile composite, the panel sections swell until saturated. The swelled and saturated panel sections create a impermeable or at least a low permeable area that diverts the remaining liquid toward the vents within the fibrous web where no particles of super absorbent polymer reside to permit the passing of the liquid therethrough.

Vents 322 allow the liquid in the geotextile composite 300 to flow through the vented diversion layer 320. Thus, panel sections 324 of vented diversion layer 320 redirect the flow of liquid so that the liquid stays in contact with the adsorptive particulates 312 for a longer length of flow and possibly for a longer period of time as the liquid travels towards the vents 322.

For instance, as shown in FIG. 10, liquid can flow in a direction A into the geotextile composite 300 through pre-filter layer 302 and intermediate layer 306 into the fibrous web layer 312 and intermediate layer 308. The liquid then encounters vented diversion layer 320 that includes panel sections 324 and vents 322. The panel sections 324 divert the flow of liquid in a direction B through the fibrous web layer 310 and intermediate layer 308. The liquid continues to flow in direction B until a vent 322 is encountered, where the liquid flows through vent 322 in direction C and out through post-filter layer 304 and the textile composite 300. This redirection of the flow of liquid increases the contact of the liquid and/or sediment with the adsorptive particulates 312 to increase the opportunity for removal of contaminants from the liquid and/or sediment.

As shown in FIG. 11, vents 322 can be spaced apart throughout vented diversion layer 320 between panel sections 324. The vented diversion layer 320 can have vents 322 that extend about the length L of the panel of geotextile composite 300 and are spaced apart at a distance $D_1$ from each other. Vents 322 can have widths $D_2$ that permit a controlled flow through the vented diversion layer 320. The distance $D_1$ of each panel section 324 of the vented diversion layer 320 can be selected to increase exposure of the contaminated liquid to the adsorptive particulates 312. For example, in general, the widths $D_2$ of the vents 322 can be smaller in size than the distance $D_1$ of each panel section 324 of the vented diversion layer 320. In other embodiments, the vented diversion layer 320 can be discrete vents that are positioned throughout the vented diversion layer 320. For example, the discrete vents can be staggered throughout the vented diversion layer 320.

EXAMPLES

Three different examples of the geotextile composites as described above were tested to determine their physical properties. Example 1 was a geotextile composite that has a polypropylene needle-punched nonwoven as a pre-filter layer, and a polypropylene needle-punched nonwoven as a post-filter layer. Example 1 further included a composite structure having a fibrous web with adsorptive particulates therein disposed between two intermediate layers. The adsorptive particulates were immobilized within the fibrous web in a manner described above with the amount of adsorptive particulates being about 400 g\m². The composite structure was placed between the pre-filter layer and the post-filter layer with the layers then being needle-punched together to form the geotextile composite for example 1.

PHYSICAL PROPERTIES OF EXAMPLE 1

| PROPERTY | TEST METHOD | VALUES |
|---|---|---|
| Mass Per Unit Area | ASTM D-5261 | 32 oz/yd² |
| Grab Tensile Strength | | |
| Machine Direction | ASTM D-4632 | 375 lbs |
| Grab Elongation | | |
| Machine Direction | ASTM D-4632 | 40% |
| Puncture Strength (⅝₁₆ - PIN) | ASTM D-4833 | 200 lbs |
| Mullen Burst Strength | ASTM D-3786 | 800 psi |
| Trapezoid Tear Strength (MD) | ASTM D-4533 | 130 lbs |
| Roll Size - | | |

Width - 15 feet (up to 24 feet)
Length - 300 feet

Example 2 was a geotextile composite that has a polypropylene needle-punched nonwoven as a pre-filter layer, a polypropylene needle-punched nonwoven as a post-filter layer. Example 2 further included a two composite structure with each having a fibrous web with adsorptive particulates therein disposed between two intermediate layers. The adsorptive particulates were immobilized within the fibrous web in a manner described above with the amount of adsorptive particulates being about 400 g\m² in each of the two composite structures. The two composite structures were placed between the pre-filter layer and the post-filter layer with the layers then being needle-punched together to form the geotextile composite for example 2. The total amount of adsorptive particulates was about 800 g\m² for the geotextile composite of Example 2.

PHYSICAL PROPERTIES OF EXAMPLE 2

| PROPERTY | TEST METHOD | VALUES |
|---|---|---|
| Mass Per Unit Area | ASTM D-5261 | 46 oz/yd² |
| Grab Tensile Strength | | |
| Machine Direction | ASTM D-4632 | 400 lbs |
| Grab Elongation | | |
| Machine Direction | ASTM D-4632 | 40% |
| Puncture Strength (⅝₁₆ - PIN) | ASTM D-4833 | 200 lbs |
| Mullen Burst Strength | ASTM D-3786 | 900 psi |
| Trapezoid Tear Strength (MD) | ASTM D-4533 | 145 lbs |
| Roll Size - | | |

Width - 15 feet (up to 24 feet)
Length - 300 feet

Example 3 was a geotextile composite that has a polypropylene needle-punched nonwoven as a pre-filter layer, a polypropylene needle-punched nonwoven as a post-filter layer. Example 3 further included a three composite structure with each having a fibrous web with adsorptive particulates therein disposed between two intermediate layers. The adsorptive particulates were immobilized within the fibrous web in a manner described above with the amount of adsorptive particulates being about 400 g\m² in each of the three composite structures. The three composite structures were placed between the pre-filter layer and the post-filter layer with the layers then being needle-punched together to form the geotextile composite for example 3. The total amount of adsorptive particulates was about 1200 g\m² for the geotextile composite of Example 3.

PHYSICAL PROPERTIES OF EXAMPLE 3

| PROPERTY | TEST METHOD | VALUES |
|---|---|---|
| Mass Per Unit Area | ASTM D-5261 | 60 oz/yd² |
| Grab Tensile Strength | | |
| Machine Direction | ASTM D-4632 | 400 lbs |
| Grab Elongation | | |
| Machine Direction | ASTM D-4632 | 40% |
| Puncture Strength (⅝₁₆ - PIN) | ASTM D-4833 | 225 lbs |
| Mullen Burst Strength | ASTM D-3786 | 1000 psi |
| Trapezoid Tear Strength (MD) | ASTM D-4533 | 125 lbs |
| Roll Size - | | |

Width - 15 feet (up to 24 feet)
Length - 300 feet

Below are results from the testing of the three examples concerning water filtration efficiencies.

WATER FILTRATION EFFICIENCY TESTING

Test Method: Initial Retention Efficiency per ASTM F795-88
Fluid: Water                                          Temperature: Ambient
Flow Rate: 1 gpm/ft²
Instrumentation: H/R LD 400 s/n 95030089              Next Cal: 2/08
Contaminant: Latex Spheres
Description of Samples: Carbon impregnated flat sheets cut to 0.054 ft²

| | | Particles/200 ml at: (in microns) | | | | |
|---|---|---|---|---|---|---|
| Sample | Port | 2-3 | 3-5 | 5-7 | 7-8 | 8-15 |
| Example 1 | Upstream | 120146 | 162304 | 98326 | 21732 | 54418 |
| | Downstream | 112759 | 123704 | 66805 | 10425 | 18947 |
| | Efficiency | 6.15 | 23.78 | 32.06 | 52.03 | 65.18 |

WATER FILTRATION EFFICIENCY TESTING
-continued

| | | | | | | |
|---|---|---|---|---|---|---|
| Example 2 | Upstream | 97573 | 121817 | 79147 | 15719 | 41164 |
| | Downstream | 78944 | 65200 | 32207 | 4500 | 8863 |
| | Efficiency | 19.09 | 46.48 | 59.31 | 71.37 | 78.47 |
| Example 3 | Upstream | 120567 | 170158 | 95894 | 22933 | 53983 |
| | Downstream | 77274 | 57141 | 22648 | 2328 | 3045 |
| | Efficiency | 35.91 | 66.42 | 76.38 | 89.85 | 94.36 |

WATER FILTRATION EFFICIENCY TESTING

Test Method: Initial Retention Efficiency per ASTM F795-88
Fluid: Water
Temperature: Ambient
Flow Rate: 1 gpm/ft$^2$
Instrumentation: H/R LD 400 s/n 95030089
Next Cal: 2/08
Contaminant: Latex Spheres
Description of Samples: Carbon impregnated flat sheets cut to 0.054 ft$^2$

| Sample | Port | Particles/200 ml at: (in microns) | | | | | | | |
|---|---|---|---|---|---|---|---|---|---|
| | | 15-25 | 25-30 | 30-40 | 40-50 | 50-60 | 60-70 | 70-80 | >80 |
| Example 1 | Upstream | 52597 | 21390 | 12128 | 21732 | 10237 | 10239 | 6903 | 6450 |
| | Downstream | 18923 | 6149 | 2145 | 10425 | 62 | 6 | 1 | <1 |
| | Efficiency | 64.02 | 71.25 | 82.31 | 52.03 | 98.03 | 99.94 | >99.9 | >99.9 |
| Example 2 | Upstream | 52342 | 22851 | 13575 | 15719 | 16978 | 12503 | 9208 | 8778 |
| | Downstream | 10200 | 2574 | 639 | 4500 | 50 | 3 | 1 | 1 |
| | Efficiency | 80.51 | 88.74 | 95.29 | 71.37 | 99.71 | >99.9 | >99.9 | >99.99 |
| Example 3 | Upstream | 51522 | 22270 | 12117 | 22933 | 12944 | 10315 | 7153 | 6889 |
| | Downstream | 5819 | 1860 | 458 | 2328 | 18 | <1 | 3 | <1 |
| | Efficiency | 88.71 | 91.65 | 96.22 | 89.85 | 99.86 | >99.9 | >99.9 | >99.9 |

As can be seen from the test results, the examples of the geotextile composites provide exceptional and uniform water filtration efficiencies. Further, the examples of the geotextile composites demonstrate that the geotextile composites are strong, durable and stable enough to be oriented in a vertical or horizontal direction without significant loss in the geotextile composites' ability to provide excellent water filtration efficiencies.

Embodiments of the present disclosure shown in the drawings and described above are exemplary of numerous embodiments that can be made within the scope of the appending claims. It is contemplated that the configurations described herein can comprise numerous configurations other than those specifically disclosed. The scope of a patent issuing from this disclosure will be defined by these appending claims.

What is claimed:

1. A method of filtering a liquid to remove at least one contaminant therefrom, the method comprising:
   providing a geotextile composite comprising:
      a pre-filter layer;
      a post-filter layer;
      at least two intermediate filter layers disposed between the pre-filter layer and the post-filter layer;
      at least one fibrous web comprising composite fibers and adsorptive particulates disposed between the at least two intermediate filters, the composite fibers of the fibrous web having a structural component and a thermally-bondable, polymeric component, and the adsorptive particulates being distributed uniformly throughout the fibrous web with the adsorptive particulates being immobilized in the fibrous web by thermally bonding the composite fibers together and thermally bonding the adsorptive particulates to the composite fibers by the thermally-bondable, polymeric component;
   placing the geotextile in a location where a liquid that contains contaminants therein resides;
   passing the liquids through the geotextile such that the liquid contacts the adsorptive particulate; and
   filtering the contaminants from the liquid through contact of the contaminants with the adsorptive particulate.

2. The method according to claim 1, wherein the step of placing includes vertically orienting the geotextile in a body of liquid with the geotextile acting as a turbidity curtain.

3. The method according to claim 1, wherein the step of placing includes horizontally orienting the geotextile.

4. The method according to claim 1, wherein the step of filtering occurs at a water filtration efficiency down to about 2 microns.

5. The method according to claim 1, wherein the pre-filter layer, the post-filter layer and the at least two intermediate filter layers of the geotextile create a multi-staged gradient density filter media.

6. The method according to claim 1 wherein the geotextile composite further comprises a vented diversion layer disposed between the fibrous web and the post-filter layer, the vented diversion layer configured to include vents therein through which liquid is flowable.

* * * * *